United States Patent
Guo et al.

(10) Patent No.: US 10,051,478 B2
(45) Date of Patent: Aug. 14, 2018

(54) METHOD FOR SCHEDULING UNLICENSED SPECTRUM, USER EQUIPMENT, AND BASE STATION

(71) Applicant: HUAWEI TECHNOLOGIES CO., LTD., Shenzhen, Guangdong (CN)

(72) Inventors: Yi Guo, Shanghai (CN); Qinghai Zeng, Shanghai (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 15/631,859

(22) Filed: Jun. 23, 2017

(65) Prior Publication Data
US 2017/0295499 A1    Oct. 12, 2017

Related U.S. Application Data

(63) Continuation of application No. PCT/CN2014/095157, filed on Dec. 26, 2014.

(51) Int. Cl.
| | |
|---|---|
| *H04W 72/00* | (2009.01) |
| *H04W 16/14* | (2009.01) |
| *H04W 72/12* | (2009.01) |
| *H04W 72/04* | (2009.01) |

(52) U.S. Cl.
CPC ....... *H04W 16/14* (2013.01); *H04W 72/0446* (2013.01); *H04W 72/12* (2013.01)

(58) Field of Classification Search
CPC .............................. H04W 72/12; H04W 16/14
USPC ......................................................... 455/454
See application file for complete search history.

(56) References Cited

U.S. PATENT DOCUMENTS

| | | | |
|---|---|---|---|
| 2014/0036853 A1 | 2/2014 | Kim et al. | |
| 2014/0287769 A1 | 9/2014 | Taori et al. | |
| 2014/0341018 A1 | 11/2014 | Bhushan et al. | |
| 2015/0139175 A1* | 5/2015 | Ratasuk | H04L 5/0051 370/330 |

(Continued)

FOREIGN PATENT DOCUMENTS

| | | |
|---|---|---|
| EP | 2732582 | 1/2013 |
| WO | WO2013006988 | 1/2013 |

OTHER PUBLICATIONS

International Search Report dated Oct. 12, 2015 in corresponding International Application No. PCT/CN2014/095157.

(Continued)

*Primary Examiner* — Charles Shedrick
(74) *Attorney, Agent, or Firm* — Staas & Halsey LLP

(57) ABSTRACT

Embodiments of the present invention provide a method which includes: first, receiving, by user equipment UE, a first scheduling time sent by a base station, where the first scheduling time is a time used by the UE to use the unlicensed spectrum based on a wireless cellular network and/or a time used by the UE to use the unlicensed spectrum based on a non-wireless cellular network; next, receiving, by the UE, an indication sent by the base station, where the indication is used to indicate that the base station has obtained the unlicensed spectrum, or indicate an offset time of the first scheduling time; and finally, obtaining, by the UE, a second scheduling time according to the indication and the first scheduling time, to use the unlicensed spectrum according to the second scheduling time based on the wireless cellular network and/or the non-wireless cellular network.

16 Claims, 3 Drawing Sheets

(56) References Cited

U.S. PATENT DOCUMENTS

2017/0150367 A1* 5/2017 Han .................... H04W 16/14

OTHER PUBLICATIONS

3GPP: "3*rd* Generation Partnership Project; Technical Specification Group Access Network; Evolved Universal Terrestrial Radio Access (E-UTRA); Study on signaling and procedure for interference avoidance for in-device coexistence (Release 11)," 3GPP TR 36.816, V11.2.0, Dec. 2011.

Ericsson et al.: "Study on Licensed-Assisted Access using LTE," 3GPP TSG RAN, Meeting #65, Edinburgh, Scotland, Sep. 9-12, 2014, RP-141646.

International Search Report dated Oct. 12, 2015 in corresponding International Patent Application No. PCT/CN2014/095157.

3GPP TS 36.300 V12.3.0 (Sep. 2014), *3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)*, pp. 1-215.

3GPP TS 36.321 V12.3.0 (Sep. 2014), *3rd Generation Partnership Project; Technical Specification Group Radio Access Network; Evolved Universal Terrestrial Radio Access (E-UTRA); Medium Access Control (MAC) protocol specification (Release 12)*, pp. 1-57.

3GPP TS 36.331 V12.3.0 (Sep. 2014), *3rd Generation Partnership Project; Technical Specification Group Radio Access Network; Evolved Universal Terrestrial Radio Access (E-UTRA); Radio Resource Control (RRC); Protocol specification (Release 12)*, pp. 1-378.

3GPP TSG RAN WG1 Meeting #79, R1-144666, San Francisco, USA, Nov. 17-21, 2014, *Discussion on PHY layer options for LAA using LTE*, Intel Corporation, pp. 1-6.

Extended European Search Report, dated Nov. 28, 2017, in European Application No. 14908838.7 (14 pp.).

* cited by examiner

METHOD FOR SCHEDULING UNLICENSED SPECTRUM, USER EQUIPMENT, AND BASE STATION

CROSS-REFERENCE TO RELATED APPLICATIONS

This application is a continuation of International Application No. PCT/CN2014/095157, filed on Dec. 26, 2014, the disclosure of which is hereby incorporated by reference in its entirety.

TECHNICAL FIELD

Embodiments of the present invention relate to the field of communications technologies, and in particular, to a method for scheduling an unlicensed spectrum, user equipment, and a base station.

BACKGROUND

Generally, spectrum resources may be classified into a licensed spectrum resource and an unlicensed spectrum resource. The unlicensed spectrum resource is a spectrum resource that is not licensed to any telecommunications operator. With rapid development of packet services and smart terminals, high-speed and large-data volume services have increasingly high requirements on a spectrum Utilization value of the unlicensed spectrum resource gradually increases.

Currently, an unlicensed spectrum is shared on user equipment (User Equipment, UE for short) by a non-wireless cellular network such as a Wireless Fidelity (Wireless Fidelity, WIFI for short) technology and a wireless cellular network such as a Long Term Evolution (Long Term Evolution, LTE for short) technology. In this case, if the wireless cellular network and the non-wireless cellular network cannot coordinate use of the unlicensed spectrum, interference may be caused to the UE.

However, using the LTE technology as an example, generally, a time used by a base station to obtain an unlicensed spectrum resource is relatively short, and even is only several milliseconds. A possible case is: Before the base station resolves the interference, there is already no available unlicensed spectrum resource Therefore, the interference is not effectively resolved, and the unlicensed spectrum cannot be used appropriately.

SUMMARY

Embodiments of the present invention provide a method for scheduling an unlicensed spectrum, user equipment, and a base station, so that an unlicensed spectrum resource can be used appropriately, and a network communication capability is improved.

According to a first aspect, an embodiment of the present invention provides a method for scheduling an unlicensed spectrum, including: receiving, by user equipment UE, a first scheduling time sent by a base station, where the first scheduling time is a time used by the UE to use the unlicensed spectrum based on a wireless cellular network and/or a time used by the UE to use he unlicensed spectrum based on a non-wireless cellular network; receiving, by the UE, an indication sent by the base station, where the indication is used to indicate that the base station has obtained the unlicensed spectrum, or indicate an offset time of the first scheduling time; obtaining, by the UE, a second scheduling time according to the indication and the first scheduling time; and using, by the UE, the unlicensed spectrum according to the second scheduling time based on the wireless cellular network and/or the non-wireless cellular network.

With reference to the first aspect, in a first possible implementation manner of the first aspect, when the indication is used to indicate that the base station has obtained the unlicensed spectrum, the method further includes determining a first time at which the indication is received, where the first time includes a system frame number SFN and/or a subframe number; and the obtaining, by the UE, a second scheduling time according to the indication and the first scheduling time specifically includes: when the first scheduling time includes a first system frame number SFN and/or a first subframe number, the second scheduling time includes the first time; or when the first scheduling time includes a first duration, the second scheduling time includes the first duration and the system frame number SFN, or the second scheduling time includes the first duration and the subframe number, or the second scheduling time includes the first duration, the system frame number SFN, and the subframe number; or when the first scheduling time includes a first period, the second scheduling time includes the first period and the system frame number SFN, or the second scheduling time includes the first period and the subframe number, or the second scheduling time includes the first period, the system frame number SFN, and the subframe number; or when the first scheduling time includes a first duration and a first period, the second scheduling time includes the first duration, the first period, and the system frame number SFN, or the second scheduling time includes the first duration, the first period, and the subframe number, or the second scheduling time includes the first duration, the first period, the system frame number SFN, and the subframe number.

With reference to the first aspect, in a second possible implementation manner of the first aspect, when the indication is used to indicate the offset time of the first scheduling time, the obtaining, by the UE, a second scheduling time according to the indication and the first scheduling time specifically includes: when the first scheduling time includes a first system frame number SFN, obtaining, by the UE, a second system frame number SFN according to the first system frame number SFN and the offset time, where the second scheduling time includes the second system frame number SFN; or when the first scheduling time includes a first subframe number, obtaining, by the UE, a second subframe number according to the first subframe number and the offset time, where the second scheduling time includes the second subframe number; or when the first scheduling time includes a first duration, obtaining, by the UE, a second duration according to the first duration and the offset time, where the second scheduling time includes the second duration; or when the first scheduling time includes a first period, obtaining, by the UE, a second period according to the first period and the offset time, where the second scheduling time includes the second period.

With reference to the first aspect, in a third possible implementation manner of the first aspect, when the indication is used to indicate the offset time of the first scheduling time, the method further includes determining a first time at which the indication is received, where the first time includes a system frame number SFN and/or a subframe number; and the obtaining, by the UE, a second scheduling time according to the indication and the first scheduling time specifically includes: when the first scheduling time includes a first system frame number SFN and/or a first subframe number, the second scheduling time includes the system frame number SFN and/or a third subframe number; or when the first scheduling time includes a first duration, the second scheduling time includes the first duration and the system frame number SFN, or the second scheduling time includes the first duration and a third subframe number, or the second scheduling time includes the first duration, the system frame number SFN, and a third subframe number; or when the first scheduling time includes a first period, the second scheduling time includes the first period and the system frame number SFN, or the second scheduling time includes the first period and a third subframe number, or the second scheduling time includes the first period, the system frame number SFN, and a third subframe number; or when the first scheduling time includes a first duration and a first period, the second scheduling time includes the first duration, the first period, and the system frame number SFN, or the second scheduling time includes the first duration, the first period, and a third subframe number, or the second scheduling time includes the first duration, the first period, the system frame number SFN, and a third subframe number; where the UE obtains the third subframe number according to the subframe number and the offset time.

With reference to the first aspect or the first possible implementation manner or the second possible implementation manner or the third possible implementation manner of the first aspect, in a fourth possible implementation manner of the first aspect the method further includes: sending, by the UE, a suggested scheduling time to the base station, so that the base station obtains the first scheduling time according to a scheduling mode of the wireless cellular system on the unlicensed spectrum and the suggested scheduling time.

According to a second aspect, an embodiment of the present invention provides a method for scheduling an unlicensed spectrum, including: sending, by a base station, a first scheduling time to user equipment UE, where the first scheduling time is a time used by the UE to use the unlicensed spectrum based on a wireless cellular network and/or a time used by the UE to use the unlicensed spectrum based on a non-wireless cellular network; and sending, by the base station, an indication to the UE, where the indication is used to indicate that the base station has obtained the unlicensed spectrum, or indicate an offset time of the first scheduling time, so that the UE obtains a second scheduling time according to the indication and the first scheduling time, and uses the unlicensed spectrum according to the second scheduling time based on the wireless cellular network and/or the non-wireless cellular network.

With reference to the second aspect, in a first possible implementation manner of the second aspect, when the indication is used to indicate that the base station has obtained the unlicensed spectrum, a time at which the UE receives the indication is a first time, and the first time includes a system frame number SFN and/or a subframe number, when the first scheduling time includes a first system frame number SFN and/or a first subframe number, the second scheduling time includes the first time; or when the first scheduling time includes a first duration, the second scheduling time includes the first duration and the system frame number SFN, or the second scheduling time includes the first duration and the subframe number, or the second scheduling time includes the first duration, the system frame number SFN, and the subframe number; or when the first scheduling time includes a first period, the second scheduling time includes the first period and the system frame number SFN, or the second scheduling time includes the first period and the subframe number, or the second scheduling time includes the first period, the system frame number SFN, and the subframe number; or when the first scheduling time includes a first duration and a first period, the second scheduling time includes the first duration, the first period, and the system frame number SFN, or the second scheduling time includes the first duration, the first period, and the subframe number, or the second scheduling time includes the first duration, the first period, the system frame number SFN, and the subframe number.

With reference to the second aspect, in a second possible implementation manner of the second aspect, when tire indication is used to indicate the offset time of the first scheduling time, when the first scheduling time includes a first system frame number SFN, the second scheduling time includes a second system frame number SFN, where the second system frame number SFN is obtained .according to the first system frame number SFN and the offset time; or when the first scheduling time includes a first subframe number, the second scheduling time includes a second subframe number, where the second subframe number is obtained according to the first subframe number and the offset time; or when the first scheduling time includes a first duration, the second scheduling time includes the second duration, where the second duration is obtained according to the first duration and the offset time; or when the first scheduling time includes a first period, the second scheduling time includes a second period, where the second period is obtained according to the first period and the offset time.

With reference to the second aspect, in a third possible implementation manner of the second aspect, when the indication is used to indicate the offset time of the first scheduling time, a time at which the UE receives the indication is a first time, and the first time includes a system frame number SFN and/or a subframe number, when the first scheduling time includes a first system frame number SFN and/or a first subframe number, the second scheduling time includes the system frame number SFN and/or a third subframe number; or when the first scheduling time includes a first duration, the second scheduling time includes the first duration and the system frame number SFN. or the second scheduling time includes the first duration and a third subframe number, or the second scheduling time includes the first duration, the system frame number SFN, and a third subframe number; or when the first scheduling time includes a first period, the second scheduling time includes the first period and the system frame number SFN. or the second scheduling time includes the period and a third subframe number, or the second scheduling time includes the period, the system frame number SFN, and a third subframe number; or when the first scheduling time includes a first duration and a first period, the second scheduling time includes the first duration, the first period, and the system frame number SFN, or the second scheduling time includes the first duration, the first period, and a third subframe number, or the second scheduling time includes the first duration, the first period, the system frame number SFN, and a third subframe number; where the third subframe number is obtained according to the subframe number and the offset time.

With reference to the second aspect or the first possible implementation manner or the second possible implementation manner or the third possible implementation manner of the second aspect, in a fourth possible implementation manner of the second aspect, the method further includes: receiving, by the base station, a suggested scheduling time sent by the UE; and obtaining, by the base station, the first scheduling time according to a scheduling mode of the wireless cellular system on the unlicensed spectrum and the suggested scheduling time.

According to a third aspect, an embodiment of the present invention provides user equipment, including; a receiving module, configured to:

receive a first scheduling time sent by a base station, where the first scheduling time is a time used by the user equipment UE to use an unlicensed spectrum based on a wireless cellular network and/or a time used by the UE to use an unlicensed spectrum based on a non-wireless cellular network; and receive an indication sent by the base station, where the indication is used to indicate that the base station has obtained the unlicensed spectrum, or indicate an offset time of the first scheduling time: an obtaining module, configured to obtain a second scheduling time according to the indication and the first scheduling time; and a processing module, configured to use the unlicensed spectrum according to the second scheduling time based on the wireless cellular network and/or the non-wireless cellular network.

With reference to the third aspect, in a first possible implementation manner of the third aspect, when the indication is used to indicate that the base station has obtained the unlicensed spectrum, the user equipment further includes a determining module, configured to determine a first time at which the indication is received, where the first time includes a system frame number SFN and/or a subframe number; and the obtaining unit is specifically configured to; when the first scheduling time includes a first system frame number SFN and/or a first subframe number, the obtained second scheduling time includes the first time; or when the first scheduling time includes a first duration, the obtained second scheduling time includes the first duration and the system frame number SFN, or the second scheduling time includes the first duration and the subframe number, or the second scheduling time includes the first duration, the system frame number SFN, and the subframe number; or when the first scheduling time includes a first period, the obtained second scheduling time includes the first period and the system frame number SFN, or the second scheduling time includes the first period and the subframe number, or the second scheduling time includes the first period, the system frame number SFN, and the subframe number; or when the first scheduling time includes a first duration and a first period, the obtained second scheduling time includes the first duration, the first period, and the system frame number SFN, or the second scheduling time includes the first duration, the first period, and the subframe number, or the second scheduling time includes the first duration, the first period, the system frame number SFN, and the subframe number.

With reference to the third aspect, in a second possible implementation manner of the third aspect, when the indication is used to indicate the offset time of the first scheduling time, the obtaining module is specifically configured to: when the first scheduling time includes a first system frame number SFN, obtain a second system frame number SFN according to the first system frame number SFN and the offset time, where the second scheduling time includes the second system frame number SFN; or when the first scheduling time includes a first subframe number, obtain a second subframe number according to the first subframe number and the offset time, where the second scheduling time includes the second subframe number; or when the first scheduling time includes a first duration, obtain a second duration according to the first duration and the offset time, where the second scheduling time includes the second duration; or when the first scheduling time includes a first period, obtain a second period according to the first period and the offset time, where the second scheduling time includes the second period.

With reference to the third aspect, in a third possible implementation manner of the third aspect, when the indication is used to indicate the offset time of the first scheduling time, the user equipment further includes a determining module, configured to determine a first time at which the indication is received, where the first time includes a system frame number SFN and/or a subframe number; and the obtaining unit is specifically configured to. when the first scheduling time includes a first system frame number SFN and/or a first subframe number, the second scheduling time includes the system frame number SFN and/or a third subframe number; or when the first scheduling time includes a first duration, the second scheduling time includes the first duration and the system frame number SFN, or the second scheduling time includes the first duration and a third subframe number, or the second scheduling time includes the first duration, the system frame number SFN, and a third subframe number: or when the first scheduling time includes a first period, the second scheduling time includes the first period and the system frame number SFN, or the second scheduling time includes the first period and a third subframe number, or the second scheduling time includes the first period, the system frame number SFN, and a third subframe number; or when the first scheduling time includes a first duration and a first period, the second scheduling time includes the first duration, the first period, and the system frame number SFN, or the second scheduling time includes the first duration, the first period, and a third subframe number, or the second scheduling time includes the first duration, the first period, the system frame number SFN, and a third subframe number, where the obtaining module obtains the third subframe number according to the subframe number and the offset time.

With reference to the third aspect or the first possible implementation manner or the second possible implementation manner or the third possible implementation manner of the third aspect, in a fourth possible implementation manner of the third aspect, the user equipment further includes a sending module, configured to send a suggested scheduling time to the base station, so that the base station obtains the first scheduling time according to a scheduling mode of the wireless cellular system on the unlicensed spectrum and the suggested scheduling time.

According to a fourth aspect, an embodiment of the present invention provides a base station, including: an obtaining module, configured to obtain an unlicensed spectrum; and a sending module, configured to: send a first scheduling time to user equipment UE, where the first scheduling time is a time used by the UE to use the unlicensed spectrum based on a wireless cellular network and/or a time used by the UE to use the unlicensed spectrum based on a non-wireless cellular network; and send an indication to the UE, where the indication is used to indicate that the base station has obtained the unlicensed spectrum, or the indication is used to indicate an offset time of the first scheduling time, so that the UE obtains a second scheduling time according to the indication and the first scheduling time, and uses the unlicensed spectrum according to the second scheduling time based on the wireless cellular network and/or the non-wireless cellular network.

With reference to the fourth aspect. In a first possible implementation manner of the fourth aspect, when the indication is used to indicate that the base station has obtained the unlicensed spectrum, a time at which the UE receives the indication is a first time, and the first time includes a system frame number SFN and/or a subframe number, when the first scheduling time includes a first system frame number SFN and/or a first subframe number, the second scheduling time is the first time; or when the first scheduling time includes a first duration, the second scheduling time includes the first duration and the system frame number SFN, or the second scheduling time includes the first duration and the subframe number, or the second scheduling time includes the first duration, the system frame number SFN, and the subframe number; or when the first scheduling time includes a first period, the second scheduling time includes the first period and the system frame number SFN, or the second scheduling time includes the first period and the subframe number, or the second scheduling time includes the first period, the system frame number $FN, and the subframe number; or when the first scheduling time includes a first duration and a first period, the second scheduling time includes the first duration, the first period, and the system frame number SFN, or the second scheduling time includes the first duration, the first period, and the subframe number, or the second scheduling time includes the first duration, the first period, the system frame number SFN, and the subframe number.

With reference to the fourth aspect, in a second possible implementation manner of the fourth aspect, when the indication is used to indicate the offset time of the first scheduling time, when the first scheduling time includes a first system frame number SFN, the second scheduling time includes a second system frame number SFN, where the second system frame number SFN is obtained according to the first system frame number SFN and the offset time; or when the first scheduling time includes a first subframe number, the second scheduling time includes a second subframe number, where the second subframe number is obtained according to the first subframe number and the offset time; or when the first scheduling time includes a first duration, the second scheduling time includes the second duration, where the second duration is obtained according to the first duration and the offset time; or when the first scheduling time includes a first period, the second scheduling time includes a second period, where the second period is obtained according to the first period and the offset time.

With reference to the fourth aspect, in a third possible implementation manner of the fourth aspect, when the indication is used to indicate the offset time of the first scheduling time, a time at which the UE receives the indication is a first time, and the first time includes a system frame number SFN and/or a subframe number, when the first scheduling time includes a first system frame number SFN and/or a first subframe number, the second scheduling time includes the system frame number SFN and/or a third subframe number; or when the first scheduling time includes a first duration, the second scheduling time includes the first duration and the system frame number SFN, or the second scheduling time includes the first duration and a third subframe number, or the second scheduling time includes the first duration, the system frame number SFN, and a third subframe number; or when the first scheduling time includes a first period, the second scheduling time includes the first period and the system frame number SFN, or the second scheduling time includes the first period and a third subframe number, or the second scheduling time includes the first period, the system frame number SFN, and a third subframe number; or when the first scheduling time includes a first duration and a first period, tire second scheduling time includes the first duration, the first period, and the system frame number SFN, or the second scheduling time includes the first duration, the first period, and a third subframe number, or the second scheduling time includes the first duration, the first period, the system frame number SFN, and a third subframe number; where the third subframe number is obtained according to the subframe number and the offset time.

With reference to the fourth aspect or the first possible implementation manner or the second possible implementation manner or the third possible implementation manner of the fourth aspect, in a fourth possible implementation manner of the fourth aspect, the base station further includes a receiving module, configured to receive a suggested scheduling time sent by the UE; and the obtaining module is further configured to obtain the first scheduling time according to a scheduling mode of the wireless cellular system on the unlicensed spectrum and the suggested scheduling time.

According to a fifth aspect, an embodiment of the present invention provides user equipment, including: a receiver, configured to: receive a first scheduling time sent by a base station. where the first scheduling time is a time used by the user equipment UE to use an unlicensed spectrum based on a wireless cellular network and/or a time used by the UE to use an unlicensed spectrum based on a non-wireless cellular network; and receive an indication sent by the base station, where the indication is used to indicate that the base station has obtained the unlicensed spectrum, or indicate an offset time of the first scheduling time; and a processor, configured to: obtain a second scheduling time according to the indication and the first scheduling time; and use the unlicensed spectrum according to the second scheduling time based on the wireless cellular network and/or the non-wireless cellular network.

With reference to the fifth aspect, in a first possible implementation manner of the fifth aspect, when the indication is used to indicate that the base station has obtained the unlicensed spectrum, the processor is specifically configured to: determine a first time at which the indication is received, where the first time includes a system frame number SFN and/or a subframe number; and when the first scheduling time includes a first system frame number SFN and/or a first subframe number, the second scheduling time is the first time; or when the first scheduling time includes a first duration, the second scheduling time includes the first duration and the system frame number SFN, or the second scheduling time includes the first duration and the subframe number, or the second scheduling time includes the first duration, the system frame number SFN, and the subframe number; or when the first scheduling time includes a first period, the second scheduling time includes the first period and the system frame number SFN, or the second scheduling time includes the first period and the subframe number, or the second scheduling time includes the first period, the system frame number SFN, and the subframe number; or when the first scheduling time includes a first duration and a first period, the second scheduling time includes the first duration, the first period, and the system frame number SFN, or the second scheduling time includes the first duration, the first period, and the subframe number, or the second scheduling time includes the first duration, the first period, the system frame number SFN, and the subframe number.

With reference to the fifth aspect, in a second possible implementation manner of the fifth aspect, when the indication is used to indicate the offset time of the first scheduling time, the processor is specifically configured to: when the first scheduling time includes a first system frame number SFN, obtain a second system frame number SFN according to the first system frame number SFN and the offset time, where the second scheduling time includes the second system frame number SFN; or when the first scheduling time includes a first subframe number, obtain a second subframe number according to the first subframe number and the offset time, where the second scheduling time includes the second subframe number; or when the first scheduling time includes a first duration, obtain a second duration according to the first duration and the offset time, where the second scheduling time includes the second duration; or when the first scheduling time includes a first period, obtain a second period according to the first period and the offset time, where the second scheduling time includes the second period.

With reference to the fifth aspect, in a third possible implementation manner of the fifth aspect, when the indication is used to indicate the offset time of the first scheduling time, the processor is specifically configured to. determine a first time at which the indication is received, where the first time includes a system frame number SFN and/or a subframe number; and when the first scheduling time includes a first system frame number SFN and/or a first subframe number, the second scheduling time includes the system frame number SFN and/or a third subframe number; or when the first scheduling time includes a first duration, the second scheduling time includes the first duration and the system frame number SFN, or the second scheduling time includes the first duration and a third subframe number, or the second scheduling time includes the first duration, the system frame number SFN, and a third subframe number; or when the first scheduling time includes a first period, the second scheduling time includes the first period and the system frame number SFN, or the second scheduling time includes the first period and a third subframe number, or the second scheduling time includes the first period, the system frame number SFN, and a third subframe number; or who the first scheduling time includes a first duration and a first period, the second scheduling time includes the first duration, the first period, and the system frame number SFN, or the second scheduling time includes the first duration, the first period, and a third subframe number, or the second scheduling time includes the first duration, the first period, the system frame number SFN, and a third subframe number; where the third subframe number is obtained according to the subframe number and the offset time.

With reference to the fifth aspect or the first possible implementation manner or the second possible implementation manner or the third possible implementation manner of the fifth aspect, in a fourth possible implementation manner of the fifth aspect, the user equipment further includes a transmitter, configured to send a suggested scheduling time to the base station, so that the base station obtains the first scheduling time according to a scheduling mode of the wireless cellular system on the unlicensed spectrum and the suggested scheduling time.

According to a sixth aspect, an embodiment of the present invention provides a base station, including; a processor, configured to obtain an unlicensed spectrum; and a transmitter, configured to: send a first scheduling time to user equipment UE, where the first scheduling time is a time used by the UE to use the unlicensed spectrum based on a wireless cellular network and/or a time used by the UE to use the unlicensed spectrum based on a non-wireless cellular network; and send an indication to the UE, where the indication is used to indicate that the base station has obtained the unlicensed spectrum, or the indication is used to indicate an offset time of the first scheduling time, so that the UE obtains a second scheduling time according to the indication and the first scheduling time, and uses the unlicensed spectrum according to the second scheduling time based on the wireless cellular network and/or the non-wireless cellular network.

With reference to the sixth aspect, in a first possible implementation manner of the sixth aspect, when the indication is used to indicate that the base station has obtained the unlicensed spectrum, a time at which the UE receives the indication is a first time, and the first time includes a system frame number SFN and/or a subframe number, when the first scheduling time includes a first system frame number SFN and/or a first subframe number, the second scheduling time is the first time; or when the first scheduling time includes a first duration, the second scheduling time includes the first duration and the system frame number SFN, or the second scheduling time includes the first duration and the subframe number, or the second scheduling time includes the first duration, the system frame number SFN, and the subframe number; or when the first scheduling time includes a first period, the second scheduling time includes the first period and the system frame number SFN, or the second scheduling time includes the first period and the subframe number, or the second scheduling time includes the first period, the system frame number SFN, and the subframe number; or when the first scheduling time includes a first duration and a first period, the second scheduling time includes the first duration, the first period, and the system frame number SFN, or the second scheduling time includes the first duration, the first period, and the subframe number, or the second scheduling time includes the first duration, the first period, the system frame number SFN, and the subframe number.

With reference to the sixth aspect, in a second possible implementation manner of the sixth aspect, when the indication is used to indicate the offset time of the first scheduling time, when the first scheduling time includes a first system frame number SFN, the second scheduling time includes a second system frame number SFN, where the second system frame number SFN is obtained according to the first system frame number SFN and the offset time; or when the first scheduling time includes a first subframe number, the second scheduling time includes a second subframe number, where the second subframe number is obtained according to the first subframe number and the offset time; or when the first scheduling time includes a first duration, the second scheduling time includes the second duration, where the second duration is obtained according to the first duration and the offset time; or when the first scheduling time includes a first period, the second scheduling time includes a second period, where the second period is obtained according to the first period and the offset time.

With reference to the sixth aspect, in a third possible implementation manner of the sixth aspect, when the indication is used to indicate the offset time of the first scheduling time, a time at which the UE receives the indication is a first time, and the first time includes a system frame number SFN and/or a subframe number, when the first scheduling time includes a first system frame number SFN and/or a first subframe number, the second scheduling time includes the system frame number SFN and/or a third subframe number; or when the first scheduling time includes a first duration, the second scheduling time includes the first duration and the system frame number SFN, or the second scheduling time includes the first duration and a third subframe number, or the second scheduling time includes the first duration, the system frame number SFN, and a third subframe number; or when the first scheduling time includes a first period, the second scheduling time includes the first period and the system frame number SFN, or the second scheduling time includes the period and a third subframe number, or the second scheduling time includes the period, the system frame number SFN, and a third subframe number; or when the first scheduling time includes a first duration and a first period, the second scheduling time includes the first duration, the first period, and the system frame number SFN, or the second scheduling time includes the first duration, the first period, and a third subframe number, or the second scheduling time includes the first duration, the first period, the system frame number SFN, and a third subframe number; where the third subframe number is obtained according to the subframe number and the offset time.

With reference to the sixth aspect or the first possible implementation manner or the second possible implementation manner or the third possible implementation manner of the sixth aspect, in a fourth possible implementation manner of the sixth aspect, the base station further includes a receiver, configured to receive a suggested scheduling time sent by the UE; and the processor is further configured to obtain the first scheduling time according to a scheduling mode of the wireless cellular system on the unlicensed spectrum and the suggested scheduling time.

The embodiments of the present invention provide a method for scheduling an unlicensed spectrum, user equipment, and a base station, so that an unlicensed spectrum resource can be used appropriately, and a network communication capability is improved.

BRIEF DESCRIPTION OF DRAWINGS

To describe the technical solutions in the embodiments of the present invention or in the prior art more clearly, the following briefly describes the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

Figure 1:
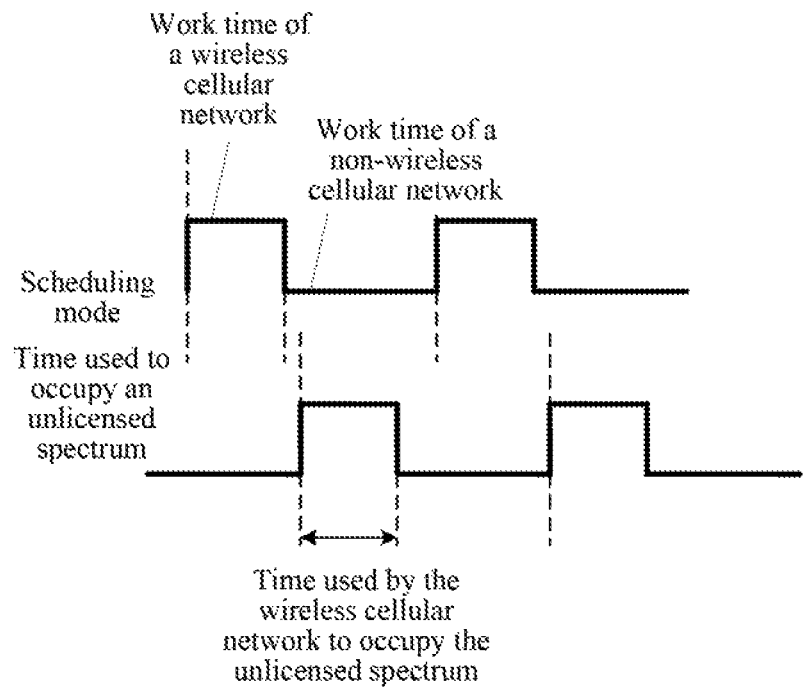
FIG. 1 is a schematic diagram of a scheduling mode and a time used to occupy an unlicensed spectrum.

The following clearly describes the technical solutions in the embodiments of the present invention with reference to the accompanying drawings to the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

The technical solutions of the present invention may be applied to various communications systems in a wireless cellular network, such as: a Global System for Mobile Communications (Global System of Mobile communication, GSM for short), a Code Division Multiple Access (Code Division Multiple Access, CDMA for short) system, a Wideband Code Division Multiple Access (Wideband Code Division Multiple Access Wireless, WCDMA for short), a general packet radio service (General Packet Radio Service, GPRS for short), a Long Term Evolution (Long Term Evolution, LTE for short) and a Universal Mobile Telecommunications System (Universal Mobile Telecommunications System, UMTS for short), which is not limned in the present invention.

In the embodiments of the present invention, user equipment (User Equipment, UE for short), also referred to as a mobile terminal (Mobile Terminal), a mobile user equipment, and the like, may communicate with one or more core networks through a radio access network (for example, Radio Access Network, RAN for short). The user equipment may be a mobile terminal, such as a mobile phone (also referred to as a "cellular" phone) and a computer with a mobile terminal. For example, the user equipment may be a portable, pocket-sized, handheld, computer built-in, or in-vehicle mobile apparatus, which exchanges language and/or data with the radio access network, which is not limited in the present invention.

A base station may be a base station (Base Transceiver Station, BTS for short) in GSM or CDMA, or may be a base station (NodeB) in WCDMA, or may be an evolved NodeB (evolved Node B, eNB or e-Node B for short) in LTE, and this is not limited in the present invention. The base station may alternatively include a control node for various access network nodes, for example, a radio network controller (Radio Network Controller, RNC for short) in the UMTS, or a controller that manages multiple small cells.

The embodiments of the present invention may also be applied to a non-wireless cellular network. For example, a wireless local area network access point (Wireless Local Area Network Access Point, WLAN AP for short) is disposed, and the wireless local area network access point, may be, for example, a Wireless Fidelity (Wireless Fidelity, WiFi for short) access point, which is not limited in the present invention.

With rapid development of packet services and smart terminals, high-speed and large-data volume services have increasingly high requirements on a spectrum. Generally, an unlicensed spectrum resource is greater than a licensed spectrum resource. An unlicensed spectrum includes a frequency band applied to industrial, scientific and medical (Industrial scientific and medical, ISM for short) devices. For example, there are three frequency bands 902 to 928 Mega Hertz. (Mega Hertz, MHz for short), 2400 to 2484.5 MHz, and 5725 to 5850 MHz in the United States, and 2.4 Giga Hertz (Giga Hertz, GHz for short) is an ISM frequency band shared by countries. A main technology used on the ISM frequency band is Wireless Fidelity WiFi, which is also referred to as a wireless local area network WLAN, Bluetooth, Zigbee (Zigbee), or the like. However, the WiFi has relatively low efficiency in aspects such as quality of service (quality of service. QoS for short) and multi-user scheduling (scheduling), and is limited in a mobility management (mobility management) function. Therefore, when a wireless cellular network technology is applied to the unlicensed spectrum, the unlicensed spectrum resource can be used more efficiently, and available spectrum bandwidth of a user is improved. For example, when an LTE technology is applied to the unlicensed spectrum, the unlicensed spectrum resource can be used more efficiently, and available spectrum bandwidth of user equipment using the LTE technology is improved. In addition to using an ISM frequency band, the LTE may further share a licensed frequency band by means of authorized shared access (Authorized Shared Access, ASA for short); or Licensed Shared Access, LSA for short), for example, use a television white space (Television While Space, TVWS for short). In this case, an authorized user has a higher priority than a secondary user, that is, a non-authorized user sharing the licensed frequency band.

In an LTE system, multiple continuous or discontinuous component carriers (Component Carrier, CC for short) may be aggregated by means of carrier aggregation (Carrier Aggregation, CA for short) to improve a peak data rate of a user and a system throughput. The aggregated component carriers include one primary cell (Primary Cell, PCell for short) and zero or more secondary cells (Secondary Cell, SCell for short). The PCell and the SCell may or may not be co-site (collocate or co-site). In the latter case, for example, an evolved NodeB (eNB) and a remote radio head (Remote Radio Head, RRH for short) in the LTE system respectively provide the PCell and the SCell. The PCell is a cell (cell) when UE initially accesses the system by means of a random access procedure (random access procedure) or a cell when UE accesses a target base station by means of a handover procedure (handover procedure). The PCell also provides security (security) and non-access stratum (Non-Access Stratum. NAS for short) signaling transmission. The SCell mainly provides an additional radio resource for data transmission. The LTE system may use the unlicensed spectrum by using the CA technology. The unlicensed spectrum needs to be shared by multiple systems, and it is difficult for the LTE to keep occupying the unlicensed spectrum. Therefore, using the unlicensed spectrum as an SCell is a flexible, secure, and feasible manner, and has relatively small impact on the existing LTE system.

However, the unlicensed spectrum resource is not licensed to a telecommunications operator. Therefore, when the wireless cellular network and the non-wireless cellular network use the unlicensed spectrum at the same time, interference may be caused, Specifically, the unlicensed spectrum is shared by the wireless cellular network and the non-wireless cellular network, and these networks may belong to different radio access technologies (Radio Access Technology, RAT for short), such as LTE, WiFi, and Bluetooth (Bluetooth) For all of the LTE, WiFi, and Bluetooth, whether there is a radar device using the unlicensed spectrum needs to be detected, and once it is detected that there is a radar device using the unlicensed spectrum, information sending on the unlicensed spectrum needs to be stopped immediately. Before transmission, the LTE, WiFi, or Bluetooth network using the unlicensed spectrum needs to sense whether the spectrum is idle, that is, listen before talk (Listen Before Talk, LBT for short), to avoid interfering with another network that is currently using the unlicensed spectrum.

In one aspect, a maximum occupation time after a network obtains the unlicensed spectrum is ruled accordingly. The unlicensed spectrum needs to be released after being used a particular time, and after the unlicensed spectrum is idle a particular time, the network re-contends for the unlicensed spectrum, so that UEs fairly contend for and use the unlicensed spectrum. The WiFi implements the LBT and channel contention by means of carrier-sense multiple access/collision avoidance (Carrier-Sense Multiple Access/Collision Avoidance, CSMA/CA for short). An access point (Access Point, AP for short) and a station (Station, STA for short) sense a busy/idle status of a channel by means of physical layer energy detection (energy detection), and reserve the unlicensed spectrum by using a Media Access Control (Medium Access Control, MAC/ for short) request-to-send (Request-To-Send, RTS for short) frame/clear-to-send (Clear-To-Send, CTS for short) frame. If the CTS frame is an RTS response frame, a receiver address (Receiver Address, RA for short) field in the CTS frame is equal to a transmitter address (Transmitter Address, TA for short) field in the RTS frame. The address is a MAC layer address. When the RTS frame is omitted and only the CTS frame is used, the CTS frame is not a response to the RTS frame, an RA field in the CTS frame is a MAC address of a transmitter, and the CTS frame is a CTS-to-self (CTS-to-self) frame. However, the mechanism can greatly resolve a problem of a hidden node, that is, a receiver may still receive interference from another node that fails to detect the transmitter.

In another aspect, with emergence of smart phones, increasing mobile phones are integrated with communications functions, such as WiFi, Bluetooth, and GPS. Because different communications functions are integrated into one chip, strong interference is caused if frequency bands are close.

There is an interference problem between an LTE Band 40 and the ISM 2.4 G frequency band, and the interference problem is particularly severe to a dual-mode mobile phone. For example, if the LTE and the WLAN/Bluetooth of a mobile phone are both enabled, data transmission of the mobile phone based on the LTE system interferes with normal use of the mobile phone based on the WLAN or the Bluetooth, and data transmission of the mobile phone based on the WLAN or the Bluetooth interferes with normal use of the mobile phone based on the LTE system.

There is also an interference problem between an LTE Band 13 (777 to 787 MHz, 746 to 756 MHz) or Band 14 (788 to 798 MHz, 758 to 768 MHz) and GPS (e.g. 1575.42 MHz), that is, sending of the LTE interferes with receiving of the GPS.

There are two methods for resolving in-device interference between an ISM frequency band and an LTE frequency band: a frequency division multiplexing (Frequency Division Multiplexing, FDM for short) method and a time-division multiplexing (Time-Division Multiplexing, TDM for short) method.

The FDM method is mainly to enable in terms of frequency LTE UE to choose to work on an LTE frequency band that is not adjacent to an IMS frequency band, that is, if UE discovers that there may be in-device interference, the UE reports frequencies that can lie used or cannot be used. In this way, a base station can reselect, for the UE, another frequency that can be used (if there is interference between the LTE system and another system at a current frequency).

The TDM method is a supplement of the FDM method, that is, the FDM method cannot resolve interference (there is no other frequency can be selected), the time division method may be used to eliminate interference. That is, the LTE system and the another system perform data transmission at different times.

Specifically, after the UE discovers the interference, tire base station resolves the interference by configuring a time-division multiplexing TDM mode, for example, configuring discontinuous reception (Discontinuous Reception, DRX for short), so that in a DRX inactive stage, the UE uses the unlicensed spectrum in a non-wireless cellular network, and in a DRX active stage, the UE uses the unlicensed spectrum in a wireless cellular network. The UE listens to and receives a physical downlink control channel (Physical Downlink Control Channel, PDCCH for short) in the active stage, and the UE does not receive downlink channel data in the inactive stage to reduce power consumption, in an implementation manner, the inactive stage may be used as a non-scheduling period of the UE in the wireless cellular network. Therefore, the period of time may be a scheduling period of the non-wireless cellular network. According to the foregoing interference analysis, a scheduling mode may be pre-configured.

FIG. 1 is a schematic diagram of a scheduling mode and a time used to occupy an unlicensed spectrum. As shown in FIG. 1, each period in the scheduling mode may be divided into a work time of a wireless cellular network and a work time of a non-wireless cellular network, and they respectively correspond to an active stage and an inactive stage in a DRX mechanism. In the embodiments of the present invention, it needs to be ensured that the unlicensed spectrum is applied to the work time of the wireless cellular network in the active stage, and the unlicensed spectrum is applied to the work time of the non-wireless cellular network in the inactive stage. Because the scheduling mode is a pre-configured mode, and in FIG. 1, a use time used by the wireless cellular network to occupy the unlicensed spectrum corresponds to an inactive stage of the wireless cellular network, appropriate use of the unlicensed spectrum cannot be ensured. Therefore, how to align the scheduling mode and the time used to occupy the unlicensed spectrum, that is, how to effectively combine the scheduling mode and a time used to occupy an unlicensed spectrum resource, is a problem that needs to be resolved in the embodiments of the present invention, to use the unlicensed spectrum resource appropriately.

Figure 2:
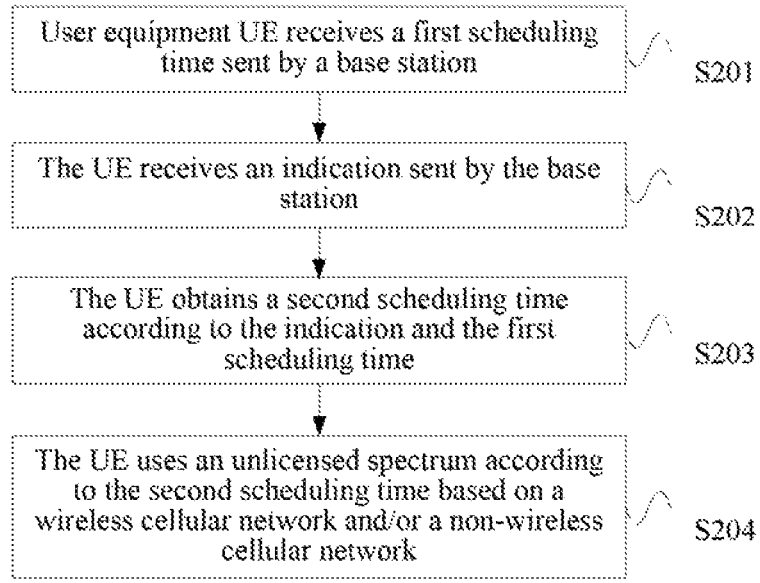
FIG. 2 is a flowchart of a method for scheduling an unlicensed spectrum according to an embodiment of the present invention.

FIG. 2 is a flowchart of a method for scheduling an unlicensed spectrum according to an embodiment of the present invention. The method is applicable to a scenario in which a wireless cellular network and a non-wireless cellular network use an unlicensed spectrum, and the non-wireless cellular network may be WiFi, Bluetooth, or the like. The method may be executed by user equipment UE.

As shown in FIG. 2, an embodiment of the present invention provides a method for scheduling an unlicensed spectrum, including the following steps:

S201: User equipment UE receives a first scheduling time sent by a base station, S202: The UE receives an indication sent by the base station.

S203: The UE obtains a second scheduling time according to the indication and the first scheduling time.

S204: The UE uses the unlicensed spectrum according to the second scheduling time based on a wireless cellular network and/or a non-wireless cellular network.

In this embodiment, the first scheduling time is a time used by the UE to use tire unlicensed spectrum based on the wireless cellular network and/or a time used by the UE to use the unlicensed spectrum based on the non-wireless cellular network. For example, the first scheduling time may correspond to the work time of the wireless cellular network and/or the work time of the non-wireless cellular network in the scheduling mode. The first scheduling time may be sent by the base station to the UE by using an existing radio resource control (Radio Resource Control, RRC for short) message or a newly constructed RRC message.

In this embodiment, tire UE receives the indication sent by the base station, where the indication is used to indicate that the base station has obtained the unlicensed spectrum, or indicate an offset time of the first scheduling time. Then the UE obtains the second scheduling time according to the indication and the first scheduling time. Therefore, the UE does not use the unlicensed spectrum only according to the first scheduling time, but obtains the second scheduling time according to the first scheduling time and the indication sent by the base station, and finally uses the unlicensed spectrum according to the second scheduling time.

In this embodiment, the UE may send a suggested scheduling time to the base station, so that the base station obtains the first scheduling time according to a scheduling mode of the wireless cellular system on the unlicensed spectrum and the suggested scheduling time.

For example, the first scheduling time sent by the base station is a result obtained by adjusting the suggested scheduling time of the user equipment UE, and the suggested scheduling time is a scheduling time that is suggested by the UE and that is used by the wireless cellular network to schedule the unlicensed spectrum, and/or a scheduling time that is suggested by the UE and that is used by the non-wireless cellular network to schedule the unlicensed spectrum.

For example, the suggested scheduling time may be obtained by using the following method:

First, the HE determines, according to a status of the non-wireless cellular network and/or a current service of the UE, a scheduling time used by tire non-wireless cellular network to schedule the unlicensed spectrum The status of the non-wireless cellular network may be an enabled or disabled state, and the current service of the UE may be at least one service of: video, voice, or webpage browse.

Then, assuming that the suggested scheduling time is a scheduling time that is suggested by the UE and that is used by the wireless cellular network to schedule the unlicensed spectrum, the UE determines that a time other than the scheduling time used by the non-wireless cellular network to schedule the unlicensed spectrum is the suggested scheduling time. For example, the scheduling time used by the non-wireless cellular network to schedule the unlicensed spectrum is that a system frame number (System Frame Number, SFN for short) is 2, a subframe is 7, a duration is 95 ms, and a period is 100 ms, where each frame includes 10 subframes, and the subframes are numbered from 0 to 9. Then the UE may determine, according to the period 100 ms and the duration 95 ms, that a suggested duration is 100−95=5 ms, and determine, according to that each frame is 10 ms, that a suggested system frame number is 12, a suggested subframe number is 2, and a suggested period is also 100 ms. In conclusion, the suggested scheduling time may be set to: A suggested system frame number SFN is 12, a suggested subframe number is 2, a suggested duration is five subframes, that is, 5 ms, and a suggested period is 100 ms. That is, the UE considers that the wireless cellular network can schedule the unlicensed spectrum within the suggested scheduling time in the example.

Finally, the base station determines, according to a status of the wireless cellular network of the UE that currently uses a licensed spectrum, whether the suggested scheduling time needs to be adjusted. For example, it is assumed that the wireless cellular network of the UE that currently uses the licensed spectrum runs a Voice over Internet Protocol (Voice over Internet Protocol, VoIP for short) service, and the service uses semi-persistent scheduling (Semi-Persistent Scheduling, SPS for short), that is, a data packet is sent every 20 ms. Based on the foregoing example, if the sending time exactly collides with the suggested scheduling time recommended by the UE, namely, the suggested system frame number (System Frame Number, SFN for short) is 12, the suggested subframe number is 2, and the suggested duration is five subframes, that is, 5 ms. the base station needs to modify the suggested scheduling time, and a modified scheduling time is the first scheduling time. Certainly, if the collision problem does not occur, the suggested scheduling time does not need to be modified.

Further, the UE may further send interference information to the base station, where the interference information may be sent to the base station by adding the interference information to an existing RRC message or by using a new RRC message Other scheduling information may also be sent to the base station by using an existing RRC message or a new RRC message.

In this embodiment, the indication is used to indicate that the base station has obtained the unlicensed spectrum, or the indication is used to indicate the offset time of the first scheduling time. According to the two possibilities of the indication, for example, the first scheduling time is a time that is pre-configured by the base station and that is used by the wireless cellular network of the UE to use the unlicensed spectrum, then there may be three methods for obtaining the second scheduling time by the UE:

Method 1. Adjust the first scheduling time according to a time at which the indication is obtained, to obtain the second scheduling time.

For example, the first scheduling time is a time that is pre-configured by the base station and that is used by the wireless cellular network of the UE to use the unlicensed spectrum. Specifically, when the indication is used to indicate that the base station has obtained the unlicensed spectrum, the obtaining, by the UE, a second scheduling time according to the indication and the first scheduling time specifically include:

determining a first time at which the indication is received, where the first time includes a system frame number SFN and/or a subframe number; and obtaining the second scheduling time according to the first time and the first scheduling time.

In this embodiment, the obtaining the second scheduling time may include any one of the following implementation manners:

(1) When the first scheduling time includes a first system (fame number SFN and/or a first subframe number, the second scheduling time is the first time. For example, if the first scheduling time includes: a first system frame number SFN=12, and the first time is: a system frame number SFN=13 and a subframe number=2, the second scheduling time is: the system frame number SFN=13 and the subframe number=2.

(2) When the first scheduling time includes a first duration, the second scheduling time includes the first duration rind the system frame number SFN, or the second scheduling time includes the first duration and the subframe number, or the second scheduling time includes the first duration, the system frame number SFN. and the subframe number. For example, if the first scheduling time includes: a first duration=5 ms, and the first time is: a system frame number SFN=13 and a subframe number=2, the second scheduling time includes: the system frame number SFN=13, the subframe number=2, and the first duration=5 ms.

(3) When the first scheduling time includes a first period, the second scheduling time includes the first period and the system frame number SFN, or the second scheduling time includes the first period and the subframe number, or the second scheduling time includes the first period, the system frame number SFN, and the subframe number, for example, if the First scheduling time includes: a first period=100 ms. and the first time is: a system frame number SFN=13 and a subframe number=2, the second scheduling time includes: the system frame number SFN=13, the subframe number=2, and the first period=100 ms.

(4) When the first scheduling time includes a first duration and a first period, the second scheduling time includes the first duration, the first period, and the system frame number SFN, or the second scheduling time includes the first duration, the first period, and the subframe number, or the second scheduling time includes the first duration, the first period, the system frame number SFN, and the subframe number. For example, if the first scheduling time includes: a first duration=5 ms and a first period=100 ms, and the first time includes: a system frame number SFN=13 and a subframe number=2, the second scheduling time includes: the system frame number SFN=13, the subframe number=2, the first duration=5 ms, and the first period=100 ms.

Method 2. Adjust the first scheduling time according to the obtained offset time, to obtain the second scheduling time.

Specifically, when the indication is used to indicate the offset time of the first scheduling time, the obtaining, by the UE, a second scheduling time according to the indication and the first scheduling time specifically includes at least one of the following:

(1) When the first scheduling time includes a first system frame number SFN, the second scheduling time includes a second system frame number SFN, where the second system frame number SFN is obtained according to the first system frame number SFN and the offset time. For example, the second system frame number SFN may be obtained according to the first system frame number SFN and the offset time by obtaining a difference between the first system frame number SFN and the offset time Alternatively, the second system frame number SFN may be obtained by obtaining a sum of the first system frame number SFN and the offset time, but the present invention is not limited thereto. For example, if the first scheduling time is. a first system frame number SFN=12, and the offset time is 2 offset with respect to the system frame number, the second scheduling time is: a second system frame number SFN=12+2=14.

(2) When the first scheduling time includes a first subframe number, the second scheduling time includes a second subframe number, where the second subframe number is obtained according to the first, subframe number and the offset time. For example, if the first scheduling time is: a first subframe number=3, and the offset time is 2 offset with respect to the subframe, the second subframe number=5.

(3) When the first scheduling time includes a first duration, the second scheduling time includes the second duration, where the second duration is obtained according to the first duration and the offset time. For example, if the first scheduling time is: a first duration=10, and the offset time is 2 offset with respect to the duration, the second duration=12.

(4) When the first scheduling time includes a first period, the second scheduling time includes a second period, where the second period is obtained according to the first period and the offset time. For example, if the first period=100, and the offset time is 5 offset with respect to the period, the second period=105.

Certainly, this embodiment gives only a case in which the offset time is with respect to one of the four parameters, and actually, the offset time may alternatively be with respect to any combination of the four parameters. For example, there may be an offset time with respect to an SFN and an offset time with respect to a subframe number. This is determined according to an actual situation. Methods for obtaining the second scheduling time based on the offset time that are given in this embodiment of the present invention are not limited thereto, Method 3. Adjust the first scheduling time according to both a time at which the indication is obtained and the offset time, to obtain the second scheduling time.

Specifically, when the indication is used to indicate the offset time of the first scheduling time, the obtaining, by the UE, a second scheduling time according to the indication and the first scheduling time specifically includes:

determining a first time at which the indication is received, where the first time includes a system frame number SFN and/or a subframe number; and obtaining the second scheduling time according to the first time and the offset time.

The obtaining the second scheduling time may include any one of the following implementation manners:

(1) When the first scheduling time includes a first system frame number SFN and/or a first subframe number, the second scheduling time includes the system frame number SFN and/or a third subframe number For example, the third subframe number is obtained according to the subframe number and the offset time, For example, if the first scheduling time is: a first system frame number SFN=12, the first time is: a system frame number SFN=13 and a subframe number =2, and the offset time is 8 offset with respect to the subframe, the second scheduling time is: the system frame number SFN=13 and a third subframe number=10.

(2) When the first scheduling time includes a first duration, the second scheduling time includes the first duration and the system frame number SFN, or the second scheduling time includes the first duration and a third subframe number, or the second scheduling time includes the first duration, the system frame number SFN, and a third subframe number. For example, if the first scheduling time is: a first duration=5 ms, the first time is: a system frame number SFN=13 and a subframe number=2, and the offset time is 8 offset with respect to the subframe, the second scheduling time is: the system frame number SFN=13, a third subframe number=10, and the first duration=5 ms.

(3) When the first scheduling time includes a first period, the second scheduling time includes the first period and the system frame number SFN, or the second scheduling time includes the period and a third subframe number, or the second scheduling time includes the period, the system frame number SFN, and a third subframe number. For example, if the first scheduling time is: a first period=100 ms, the first time is: a system frame number SFN=13 and a subframe number=2, and the offset time is 8 offset with respect to the subframe, the second scheduling time is: the system frame number SFN=13, a third subframe number=10. and the first period=100 ms.

(4) When the first scheduling time includes a first duration and a first period, the second scheduling time includes the first duration, the first period, and the system frame number SFN, or the second scheduling time includes the first duration, the first period, and a third subframe number, or the second scheduling time includes the first duration, the first period, the system frame number SFN, and a third subframe number. For example, if the first scheduling time is: a first duration=5 ms and a first period=100 ms, the first time is: a system frame number SFN=13 and a subframe number=2, and the offset time is 8 offset with respect to the subframe, the second scheduling time is: the system frame number SFN=13, a third subframe number=10, the first duration=5 ms, and the first period=100 ms.

In this embodiment, the third subframe number is obtained according to the subframe number and the offset time. For example, the third subframe number may be obtained according to the subframe number and the offset time by obtaining a difference between the subframe number and the offset time. Alternatively, the third subframe number may be obtained by obtaining a sum of the subframe number and the offset time, but the present invention is not limited thereto.

Certainly, this embodiment gives only a case in which the offset time is with respect to one of the four parameters, and actually, the offset time may alternatively be with respect to any combination of the four parameters. For example, there may be an offset time with respect to an SFN and an offset time with respect to a subframe number. This is determined according to an actual situation, Methods for obtaining the second scheduling time based on the time of the indication and the offset time that are given in this embodiment of the present invention are not limited thereto.

In this embodiment, the offset time is obtained by converting a first offset time, where the first offset time may be an absolute time value, whose unit is millisecond, and is used to indicate a time deviation according to which the first scheduling time needs to be adjusted. The first offset time Is converted into the offset time according to lengths of each frame and subframe. For example, the first offset time is 8 ms, the length of each frame is 10 ms, the length of each subframe is 1 ms, each frame includes 10 subframes, a current subframe number=0, it is calculated that 8 ms/1 ms=8, and an offset subframe number=8. Other parameters are unchanged.

For example, the base station obtains an unlicensed spectrum resource 8 ms at a time: an SFN=13 and a subframe number=2, and prepares to perform scheduling for user equipment UE1 and user equipment UE2 within the 8 ms, that is, the 8 ms cannot be separately occupied by the user equipment UE1 or the user equipment UE2. Therefore, the base station may allocate the first 4 ms to the user equipment UE1, and allocate the last 4 ms to the user equipment UE2, A corresponding offset time setting method may be: For the user equipment UE1, a time that can be used by the base station to schedule the unlicensed spectrum should be an SFN=13, a subframe number=2, and a time used by the LTE system is 4 ms. If the pre-configured first scheduling time is: a first system frame number SFN=12, a first subframe number=0, and a time used by the LTE system is 5 ms, that is, the first duration is 5 ms, a first offset time is 11 ms or 12 ms, an offset time may be obtained according to lengths of each frame and each subframe, and a second scheduling time finally calculated according to the offset time is: an SFN=13, a subframe number=1, and a time used by the LIE system is 5 ms, or an SFN=13, a subframe number=2, and a time used by the LTE system is 5 ms. Therefore, the calculated second scheduling time completely covers the SFN=13, the subframe number 2, and the time 4 ms used by the LTE system that the base station prepares to schedule for the user equipment UE1 For the user equipment 2, the base station intends to schedule a time: an SFN=13, a subframe number=6, and a time used by the LTE system is 4 ms. If the pre-configured first scheduling time is: a first system frame number SFN=12, a first subframe number=0, and a time used by the LTE system is 5 ms, an offset time should be 15 ms or 16 ms. Then a calculated second scheduling time is: an SFN=13, a subframe number=5, and a time used by the LTE system is 5 ms, or an SFN=13, a subframe number=6, and a time used by the LTE system is 5 ms, and completely covers the SFN=13, the subframe number 6, and the time 4 ms used by the LTE system that the base station prepares to schedule for the user equipment UE2.

In the foregoing process, the offset time is obtained by correspondingly converting the first offset time, and the converted offset time may be with respect to a system frame number SFN or a subframe number. Certainly, the offset time may alternatively be with respect to a duration or a period, or be with respect to any combination of the four parameters.

As the time at which the indication is received is fully considered or the offset time provided by the base station is further used, first, it can be ensured that the unlicensed spectrum is within the second scheduling time. Next, as the second scheduling time is obtained by adjusting the first scheduling time, that is, the second scheduling time is obtained based on a pre-configured time, it can be ensured that the second scheduling time can be determined quickly. Therefore, it is ensured that the UE can use the unlicensed spectrum correctly and appropriately.

It should be noted that, the offset time in this embodiment of the present invention may alternatively be an offset provided with respect to a system frame number SFN, which is not limited in the present invention.

In this embodiment, the first scheduling time in the foregoing process may alternatively be a time that is pre-configured by the base station and that is used by the non-wireless cellular network of the UE to use the unlicensed spectrum. Then the base station may determine, according to a duration and a period in the first scheduling time, a time used by the. wireless cellular network to use the unlicensed spectrum. Assuming that the time used by the wireless cellular network to use the unlicensed spectrum is referred to as a fourth scheduling time, the fourth scheduling time herein is equivalent to the first scheduling time in the foregoing examples. Therefore, a method for determining a second scheduling time according to the fourth scheduling time is not described herein.

Similarly, the first scheduling time in the foregoing process may alternatively be times that are pre-configured by the base station and that are used by the wireless cellular network and the non-wireless cellular network of the UE to use the unlicensed spectrum. In this case, the duration in the first scheduling time may include a first, duration and a second duration. Because this embodiment of the present invention is based on a time-division multiplexing TDM mode, a sum of the first duration and the second duration may be a period. Then it is easy to determine four parameters in the time used by the wireless cellular network to use the unlicensed spectrum. A method for determining a second scheduling time according to the time is not described herein.

Further, when the non-wireless cellular network of the UE is disabled or a status of the non-wireless cellular network changes, or after the unlicensed spectrum resource is released, the base station may stop using the scheduling mode, and the base station sends a message of stopping using the scheduling mode to the UE, foal is, notifies the UE that the used scheduling mode is invalidated.

This embodiment of the present invention provides a method for scheduling an unlicensed spectrum, so that it can be ensured that UE uses an unlicensed spectrum correctly, and a network communication capability is improved.

Figure 3:
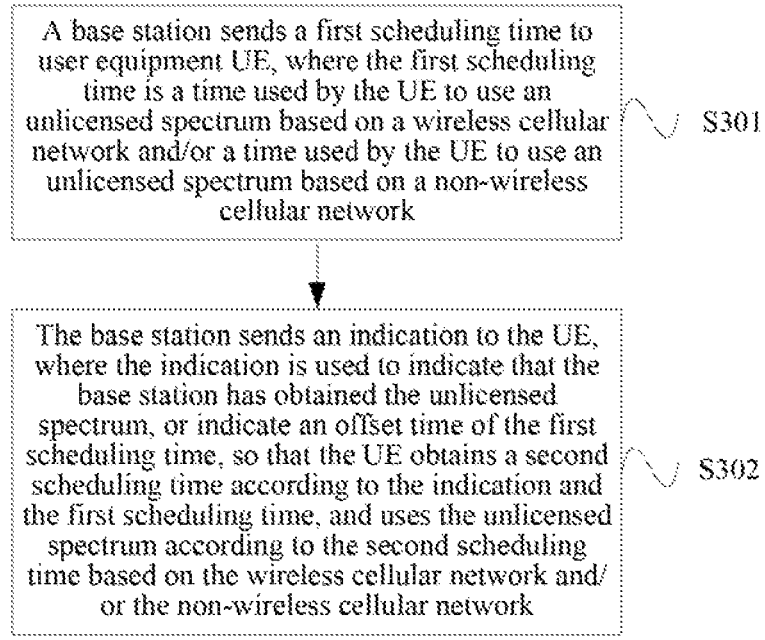
FIG. 3 is a flowchart of a method for scheduling an unlicensed spectrum according to another embodiment of the present invention.

FIG. 3 is a flowchart of a method for scheduling an unlicensed spectrum according to another embodiment of the present invention. The method is applicable to a scenario in which a wireless cellular network and a non-wireless cellular network use an unlicensed spectrum, and the non-wireless cellular network herein may be WiFi, Bluetooth, or the like. The method may be executed by a base station. The method for scheduling an unlicensed spectrum includes a specific process as follows:

S301: A base station sends a first scheduling time to user equipment UE, where the first scheduling time is a time used by the UE to use the unlicensed spectrum based on a wireless cellular network and/or a time used by the UE to use the unlicensed spectrum based on a non-wireless cellular network.

S302: The base station sends an indication to the UE, where the indication is used to indicate that the base station has obtained the unlicensed spectrum, or indicate an offset time of the first scheduling time, so that the UE obtains a second scheduling time according to the indication and the first scheduling time, and uses the unlicensed spectrum according to the second scheduling time based on the wireless cellular network and/or the non-wireless cellular network.

Optionally, the first scheduling time is the time used by the UE to use the unlicensed spectrum based on the wireless cellular network and/or the time used by the UE to use the unlicensed spectrum based on the non-wireless cellular network. Generally, the first scheduling time sent by the base station is a result obtained by adjusting a suggested scheduling time of the user equipment UE and the suggested scheduling time is a time that is suggested by the UE and that is used by the wireless cellular network to schedule the unlicensed spectrum, and/or a third scheduling time that is suggested by the UE and that is used by the non-wireless cellular network to schedule the unlicensed spectrum.

Assuming that the suggested scheduling time is a scheduling time that is suggested by the UE and that is used by the wireless cellular network to schedule the unlicensed spectrum, the UE determines that a time other than a scheduling time used by the non-wireless cellular network to schedule the unlicensed spectrum is the suggested scheduling time. For example, the scheduling time used by the non-wireless cellular network to schedule the unlicensed spectrum is that a system frame number (System Frame Number, SFN for short) is 2, a subframe is 7, a duration is 95 , and a period is 100 , where each frame includes 10 , and the subframes are numbered from 0 to 9. Then the UE may determine, according to the period 100 ms and the duration 95 ms, that a suggested duration is 100−95=5 ms, and determine, according to that each frame is 10 ms, that a suggested system frame number is 12, a suggested subframe number is 2, and a suggested period is also 100 ms. In conclusion, the suggested scheduling time may be set to: A suggested system frame number SFN is 12, a suggested subframe number is 2, a suggested duration is five subframes, that is, 5 ms, and a suggested period is 100 ms. The base station determines, according to a status of the wireless cellular network of the UE that currently uses a licensed spectrum, whether the suggested scheduling time needs to be adjusted. For example, it is assumed that the wireless cellular network of the UE that currently uses the licensed spectrum runs a Voice over Internet Protocol (Voice over Internet Protocol, VoIP for short) service, and the service uses semi-persistent scheduling (Semi-Persistent Scheduling. SPS for short), that is, a data packet is sent every 20 ms. Based on the foregoing example, if the sending time exactly collides with the suggested scheduling time recommended by the UE, namely, the suggested system frame number SFN is 12, the suggested subframe number is 2, and the suggested duration is five subframes, that is, 5 ms, the base station needs to modify the suggested scheduling time, and a modified scheduling time is the first scheduling time. Certainly, if the collision problem does not occur, the suggested scheduling time does not need to be modified.

Specifically, the indication is used to indicate that the base station has obtained the unlicensed spectrum, or the indication is used to indicate the offset time of the first scheduling time, so that the UE obtains the second scheduling time according to the indication and the first scheduling time, and uses the unlicensed spectrum according to the second scheduling time.

After the base station sends the first scheduling time to the UE, the first scheduling time is not validated immediately. Instead, only after the base station sends the indication to the UE and the first scheduling time is adjusted according to the indication, the scheduling time is validated, that is, the UE can use the unlicensed spectrum within the second scheduling time.

The following uses an example in which the first scheduling time is a time that is pre-configured by the base station and that is used by the wireless cellular network of the UE to use the unlicensed spectrum, and there are specifically three cases as follows;

In an optional manner, when the indication is used to indicate that the base station has obtained the unlicensed spectrum, a time at which the UE receives the indication is a first time, and the first time includes a system frame number SFN and/or a subframe number, the second scheduling time is obtained in any one of the following implementation manners:

when the first scheduling time includes a first system frame number SFN and/or a first subframe number, the second scheduling time is the first time; or when the first scheduling time includes a first duration, the second scheduling time includes the first duration and the system frame number SFN, or the second scheduling time includes the first duration and the subframe number, or the second scheduling time includes the first duration, the system frame number SFN, and the subframe number; or when the first scheduling time includes a first period, the second scheduling time includes the first period and the system frame number SFN, or the second scheduling time includes the first period and the subframe number, or the second scheduling time includes the first period, the system frame number SFN, and the subframe number, or when the first scheduling time includes a first duration and a first period, the second scheduling time includes the first duration, the first period, and the system frame number SFN, or the second scheduling time includes the first duration, the first period, and the subframe number, or the second scheduling time includes the first duration, the first period, the system frame number SFN, and the subframe number.

In another optional manner, when the indication is used to indicate the offset time of the first scheduling time, the second scheduling time may be obtained in any one of the following implementation manners:

when the first scheduling time includes a first system frame number SFN, the second scheduling time includes a second system frame number SFN, where the second system frame number SFN is obtained according to the first system frame number SFN and the offset time; or when the first scheduling time includes a first subframe number, the second scheduling time includes a second subframe number, where the second subframe number is obtained according to the first subframe number and the offset time; or when the first scheduling time includes a first duration, the second scheduling time includes the second duration, where the second duration is obtained according to the first duration and the offset time; or when the first scheduling time includes a first period, the second scheduling time includes a second period, where the second period is obtained according to the first period and the offset time.

In still another optional manner, when the indication is used to indicate the offset time of the first scheduling time, a time at which the UE receives the indication is a first time, and the first time includes a system frame number SFN and/or a subframe number, the second scheduling time may be obtained in any one of the following implementation manners:

when the first scheduling time includes a first system frame number SFN and/or a first subframe number, the second scheduling time includes the system frame number SFN and/or a third subframe number; or when the first scheduling time includes a first duration, the second scheduling time includes the first duration and the system frame number SFN, or the second scheduling time includes the first duration and a third subframe number, or the second scheduling time includes the first duration, the system frame number SFN, and a third subframe number; or when the first scheduling time includes a first period, the second scheduling time includes the first period and the system frame number SFN, or the second scheduling time includes the period and a third subframe number, or the second scheduling time includes the period, the system frame number SFN, and a third subframe number; or when the first scheduling time includes a first duration and a first period, the second scheduling time includes the first duration, the first period, and the system frame number SFN, or the second scheduling time includes the first duration, the first period, and a third subframe number, or the second scheduling time includes the first duration, the first period, the system frame number SFN, and a third subframe number;

where the third subframe number is obtained according to the subframe number and the offset time.

Further, the method further includes: receiving, by the base station, a suggested scheduling time sent by the UE; and obtaining, by the base station, the first scheduling time according to a scheduling mode of the wireless cellular system on the unlicensed spectrum and the suggested scheduling time.

In conclusion, in the method provided in this embodiment, a base station sends a first scheduling time and an indication to UE, so that it is ensured that the UE can use an unlicensed spectrum correctly, and a network communication capability is improved.

Figure 4:
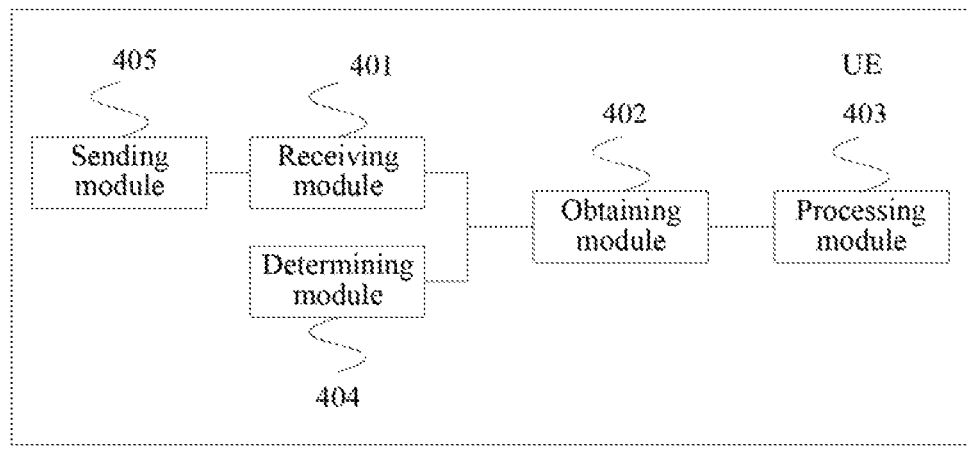
FIG. 4 is a schematic structural diagram of user equipment according to an embodiment of the present invention.

FIG. 4 is a schematic structural diagram of user equipment according to an embodiment of the present invention. The user equipment is applicable to a scenario in which a wireless cellular network and a non-wireless cellular network use an unlicensed spectrum. As shown in FIG. 4, the user equipment includes:

a receiving module 401, configured to receive a first scheduling time sent by a base station, where the first scheduling time is a time used by the user equipment UE to use an unlicensed spectrum based on a wireless cellular network and/or a time used by the UE to use an unlicensed spectrum based on a non-wireless cellular network; and receive an indication sent by the base station, where the indication is used to indicate that the base station has obtained the unlicensed spectrum, or indicate an offset time of the first scheduling time;

an obtaining module 402, configured to obtain a second scheduling time according to the indication and the first scheduling time; and a processing module 403, configured to use the unlicensed spectrum according to the second scheduling time based on the wireless cellular network and/or the non-wireless cellular network.

Optionally, when the indication is used to indicate that the base station has obtained the unlicensed spectrum, the user equipment further includes a determining module 404, configured to determine a first time at which the indication is received, where the first time includes a system frame number SFN and/or a subframe number; and the obtaining unit 402 is specifically configured to:

when the first scheduling time includes a first system frame number SFN and/or a first subframe number, the obtained second scheduling time includes the first time; or when the first scheduling time includes a first duration, the obtained second scheduling time includes the first duration and the system frame number SFN, or the second scheduling time includes the first duration and the subframe number, or the second scheduling time includes the first duration, the system frame number SFN, and the subframe number; or when the first scheduling time includes a first period, the obtained second scheduling time includes the first period and the system frame number SFN, or the second scheduling time includes the first period and the subframe number, or the second scheduling time includes the first period, the system frame number SFN, and the subframe number; or when the first scheduling time includes a first duration and a first period, the obtained second scheduling time includes the first duration, the first period, and the system frame number SFN, or the second scheduling time includes the first duration, the first period, and the subframe number, or the second scheduling time includes the first duration, the first period, the system frame number SFN, and the subframe number.

Optionally, when the indication is used to indicate the offset time of the first scheduling time, the obtaining module 402 is specifically configured to:

when the first scheduling time includes a first system frame number SFN, obtain a second system frame number SFN according to the first system frame number SFN and the offset time, where the second scheduling time includes the second system frame number SFN; or when the first scheduling time includes a first subframe number, obtain a second subframe number according to the first subframe number and the offset time, where the second scheduling time includes the second subframe number; or when the first scheduling time includes a first duration, obtain a second duration according to the first duration and the offset time, where the second scheduling time includes the second duration; or when the first scheduling time includes a first period, obtain a second period according to the first period and the offset time, w here the second scheduling time includes the second period.

Optionally, when the indication is used to indicate the offset time of the first scheduling time, the user equipment further includes a determining module 404, configured to determine a first time at which the indication is received, where the first time includes a system frame number SFN and/or a subframe number; and the obtaining unit 402 is specifically configured to:

when the first scheduling time includes a first system frame number SFN and/or a first subframe number, the second scheduling time includes the system frame number SFN and/or a third subframe number; or when the first scheduling time includes a first duration, the second scheduling time includes the first duration and the system frame number SFN, or the second scheduling time includes the first duration and a third subframe number, or the second scheduling time includes the first duration, the system frame number SFN, and a third subframe number; or when the first scheduling time includes a first period, the second scheduling time includes the first period and the system frame number SFN, or the second scheduling time includes the first period and a third subframe number, or the second scheduling time includes the first period, the system frame number SFN, and a third subframe number; or when the first scheduling time includes a first duration and a first period, the second scheduling time includes the first duration, the first period, and the system frame number SFN, or the second scheduling time includes the first duration, the first period, and a third subframe number, or the second scheduling time includes the first duration, the first period, the system frame number SFN, and a third subframe number;

where the obtaining module 402 obtains the third subframe number according to the subframe number and the offset time.

Further, the user equipment further includes: a sending module 405, configured to send a suggested scheduling time to the base station, so that the base station obtains the first scheduling time according to a scheduling mode of the wireless cellular system on the unlicensed spectrum and the suggested scheduling time.

The user equipment provided in this embodiment is configured to execute the technical implementation solution of the method for scheduling an unlicensed spectrum corresponding to FIG. 2. For example, the receiving module 401 may perform steps S201 and S202 in FIG. 2. Details are not described herein again.

The user equipment provided in this embodiment of the present invention can use an unlicensed spectrum correctly, and a network communication capability is improved.

Figure 5:
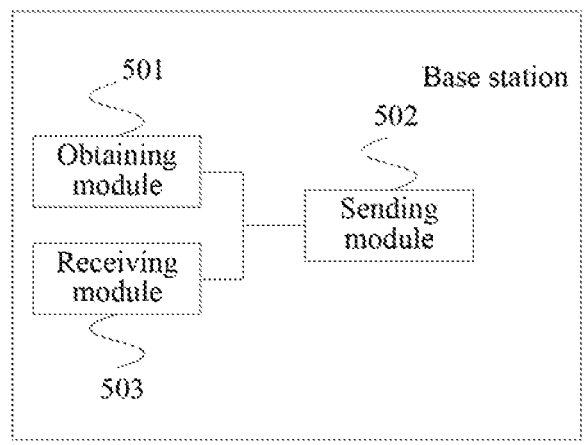
FIG. 5 is a schematic structural diagram of a base station according to an embodiment of the present invention.

FIG. 5 is a schematic structural diagram of a base station according to an embodiment of the present invention. As shown in FIG. 5, the base station includes:

an obtaining module 501, configured to obtain an unlicensed spectrum; and a sending module 502, configured to send a first scheduling time to user equipment UE, where the first scheduling time is a time used by the UE to use the unlicensed spectrum based on a wireless cellular network and/or a time used by the UE to use the unlicensed spectrum based on a non-wireless cellular network, where the sending module 502 is further configured to send an indication to the UE, where the indication is used to indicate that the base station has obtained the unlicensed spectrum, or the indication is used to indicate an offset time of the first scheduling time, so that the UE obtains a second scheduling time according to the indication and the first scheduling time, and uses the unlicensed spectrum according to the second scheduling time.

Optionally, when the indication is used to indicate that the base station has obtained the unlicensed spectrum, a time at which the UE receives the indication is a first time, and the first time includes a system frame number SFN and/or a subframe number.

when the first scheduling time includes a first system frame number SFN and/or a first subframe number, the second scheduling time is the first time; or when the first scheduling time includes a first duration, the second scheduling time includes the first duration and the system frame number SFN, or the second scheduling time includes the first duration and the subframe number, or the second scheduling time includes the first duration, the system frame number SFN, and the subframe number; or when the first scheduling time includes a first period, the second scheduling time includes the first period and the system frame number SFN, or the second scheduling time includes the first period and the subframe number, or the second scheduling time includes the first period, the system frame number SFN, and the subframe number; or when the first scheduling time includes a first duration and a first period, the second scheduling time includes the first duration, the first period, and the system frame number SFN, or the second scheduling time includes the first duration, the first period, and the subframe number, or the second scheduling time includes the first duration, the first period, the system frame number SFN, and the subframe number.

Optionally, when the indication is used to indicate tire offset time of the first scheduling time.

when the first scheduling time includes a first system frame number SFN, the second scheduling time includes a second system frame number SFN, where the second system frame number SFN is obtained according to the first system frame number SFN and the offset time; or when the first scheduling time includes a first subframe number, the second scheduling time includes a second subframe number, where the second subframe number is obtained according to the first subframe number and the offset time; or when the first scheduling time includes a first duration, the second scheduling time includes the second duration, where the second duration is obtained according to the first duration and the offset time; or when the first scheduling time includes a first period, the second scheduling time includes a second period, where the second period is obtained according to the first period and the offset time.

Optionally, when the indication is used to indicate the offset time of the first scheduling time, a time at which the UE receives the indication is a first time, and the first time includes a system frame number SFN and/or a subframe number, when the first scheduling time includes a first system frame number SFN and/or a first subframe number, the second scheduling time includes the system frame number SFN and/or a third subframe number; or when the first scheduling time includes a first duration, the second scheduling time includes the first duration and the system frame number SFN, or the second scheduling time includes the first duration and a third subframe number, or the second scheduling time includes the first duration, the system frame number SFN, and a third subframe number; or when the first scheduling time includes a first period, the second scheduling time includes the first period and the system frame number SFN, or the second scheduling time includes the first period and a third subframe number, or the second scheduling time includes the first period, the system frame number SFN, and a third subframe number; or when the first scheduling time includes a first duration and a first period, the second scheduling time includes the first duration, the first period, and the system frame number SFN, or the second scheduling time includes the first duration, the first period, and a third subframe number, or the second scheduling time includes the first duration, the first period, the system frame number SFN, and a third subframe number;

where the third subframe number is obtained according to the subframe number and the offset time.

Further, the base station further includes a receiving module 503, configured to receive a suggested scheduling time sent by the UE: and the obtaining module 501 is further configured to obtain the first scheduling time according to a scheduling mode of the wireless cellular system on the unlicensed spectrum and the suggested scheduling time.

The base station provided in this embodiment is configured to execute the method for scheduling an unlicensed spectrum corresponding to FIG. 3. For example, the sending module 502 may perform actions of S301 and S302 in FIG. 3. Details are not described herein again.

In conclusion, the base station provided in this embodiment may send a first scheduling time and an indication to UE, so that it is ensured that the UE can use an unlicensed spectrum correctly, and a network communication capability is improved.

Figure 6:
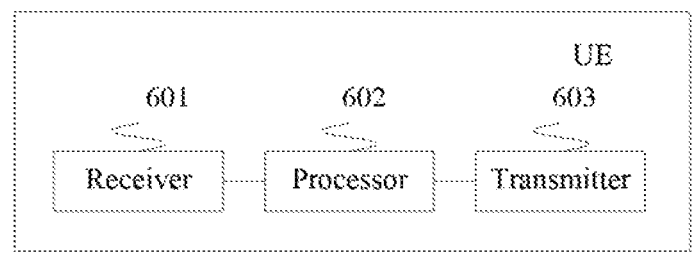
FIG. 6 is a schematic structural diagram of user equipment according to another embodiment of the present invention.

FIG. 6 is a schematic structural diagram of user equipment according to another embodiment of the present invention. The user equipment includes;

a receiver 601, configured to receive a first scheduling time sent by a base station, where the first scheduling time is a time used by the user equipment UE to use an unlicensed spectrum based on a wireless cellular network and/or a time used by the UE to use an unlicensed spectrum based on a non-wireless cellular network; and receive an indication sent by the base station, where the indication is used to indicate that the base station has obtained the unlicensed spectrum, or indicate an offset time of the first scheduling time; and a processor 602, configured to: obtain a second scheduling time according to the indication and the first scheduling time; and use the unlicensed spectrum according to the second scheduling time based on the wireless cellular network and/or the non-wireless cellular network.

In an optional manner, when the indication is used to indicate that the base station has obtained the unlicensed spectrum, the processor 602 is specifically configured to:

determine a first time at which the indication is received, where the first time includes a system frame number SFN and/or a subframe number; and when the first scheduling time includes a first system frame number SFN and/or a first subframe number, the second scheduling time is the first time; or when the first scheduling time includes a first duration, the second scheduling time includes the first duration and the system frame number SFN, or the second scheduling time includes the first duration and the subframe number, or the second scheduling time includes the first duration, the system frame number SFN, and the subframe number; or when the first scheduling time includes a first period, the second scheduling time includes the first period and the system frame number SFN, or the second scheduling time includes the first period and the subframe number, or the second scheduling time includes the first period, the system frame number SFN, and the subframe number; or when the first scheduling time includes a first duration and a first period, the second scheduling time includes the first duration, the first period, and the system frame number SFN, or the second scheduling time includes the first duration, the first period, and the subframe number, or the second scheduling time includes the first duration, the first period, the system frame number SFN, and the subframe number.

In another optional manner, when the indication is used to indicate the offset time of the first scheduling time, the processor 602 is specifically configured to:

when the first scheduling time includes a first system frame number SFN, obtain a second system frame number SFN according to the first system frame number SFN and the offset time, where the second scheduling time includes the second system frame number SFN; or when the first scheduling time includes a first subframe number, obtain a second subframe number according to the first subframe number and the offset time, where the second scheduling time includes the second subframe number; or when the first scheduling time includes a first duration, obtain a second duration according to the first duration and the offset time, where the second scheduling time includes the second duration; or when the first scheduling time includes a first period, obtain a second period according to the first period and the offset time, where the second scheduling time includes the second period.

In still another optional manner, when the indication is used to indicate the offset time of the first scheduling time, the processor 602 is specifically configured to:

determine a first time at which the indication is received, where the first time includes a system frame number SFN and/or a subframe number; and when the first scheduling time includes a first system frame number SFN and/or a first subframe number, the second scheduling time includes the system frame number SFN and/or a third subframe number; or when the first scheduling time includes a first duration, the second scheduling time includes the first duration and the system frame number SFN, or the second scheduling time includes the first duration and a third subframe number, or the second scheduling time includes the first duration, the system frame number SFN, and a third subframe number; or when the first scheduling time includes a first period, the second scheduling time includes the first period and the system frame number SFN, or the second scheduling time includes the first period and a third subframe number, or the second scheduling time includes the first period, the system frame number SFN, and a third subframe number; or when the first scheduling time includes a first duration and a first period, the second scheduling time includes the first duration, the first period, and the system frame number SFN, or the second scheduling time includes the first duration, the first period, and a third subframe number, or the second scheduling time includes the first duration, the first period, the system frame number SFN, and a third subframe number;

where the third subframe number is obtained according to the subframe number and the offset time.

Further, the user equipment further includes: a transmitter 603, configured to send a suggested scheduling time to the base station, so that the base station obtains the first scheduling time according to a scheduling mode of the wireless cellular system on the unlicensed spectrum and the suggested scheduling time.

The user equipment provided in this embodiment is configured to execute the method for scheduling an unlicensed spectrum corresponding to FIG. 2. Details are not described herein again.

In conclusion, the UE provided in this embodiment may obtain a second scheduling time according to a first scheduling time and an indication that are sent by a base station, so that it is ensured that the UE can use an unlicensed spectrum correctly, and a network communication capability is improved.

Figure 7:
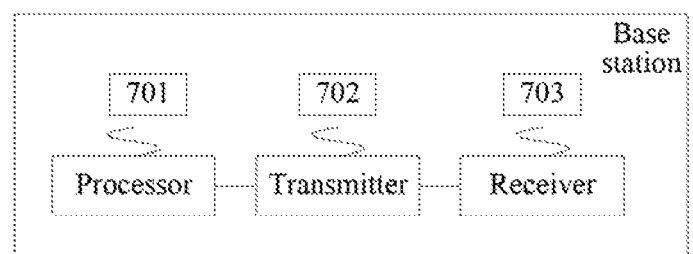
FIG. 7 is a schematic structural diagram of a base station according to another embodiment of the present invention.

FIG. 7 is a schematic structural diagram of a base station according to another embodiment of the present invention. The base station includes:

a processor 701, configured to obtain an unlicensed spectrum; and a transmitter 702, configured to send a first scheduling time to user equipment UE, where the first scheduling time is a time used by the UE to use the unlicensed spectrum based on a wireless cellular network anchor a time used by the UE to use the unlicensed spectrum based on a non-wireless cellular network, where the transmitter 702 is further configured to send an indication to the UE, where the indication is used to indicate that the base station has obtained the unlicensed spectrum, or the indication is used to indicate an offset time of the first scheduling time, so that the UE obtains a second scheduling time according to the indication and the first scheduling time, and uses the unlicensed spectrum according to the second scheduling time.

In an optional manner, when the indication is used to indicate that the base station has obtained the unlicensed spectrum, a time at which the UE receives the indication is a first time, and the first time includes a system frame number SFN and/or a subframe number, when the first scheduling time includes a first system frame number SFN and/or a first subframe number, the second scheduling time is the first time; or when the first scheduling time includes a first duration, the second scheduling time includes the first duration and the system frame number SFN, or the second scheduling time includes the first duration and the subframe number, or the second scheduling time includes the first duration, the system frame number SFN, and the subframe number; or when the first scheduling time includes a first period, the .second scheduling time includes the first period and the system frame number SFN, or the second scheduling time includes the first period and the subframe number, or the second scheduling time includes the first period, the system frame number SFN, and the subframe number; or when the first scheduling time includes a first duration and a first period, the second scheduling time includes the first duration, the first period, and the system frame number SFN, or the second scheduling time includes the first duration, the first period, and the subframe number, or the second scheduling time includes the first duration, the first period, the system frame number SFN, and the subframe number.

In another optional manner, when the indication is used to indicate the offset time of the first scheduling time, when the first scheduling time includes a first system frame number SFN, the second scheduling time includes a second system frame number SFN, where the second system frame number SFN is obtained according to the first system frame number SFN and the offset time; or when the first scheduling time includes a first subframe number, the second scheduling time includes a second subframe number, where the second subframe number is obtained according to the first subframe number and the offset time; or when the first scheduling time includes a first duration, the second scheduling time includes the second duration, where the second duration is obtained according to the first duration and the offset time; or when the first scheduling time includes a first period, the second scheduling time includes a second period, where the second period is obtained according to the first period and the offset time.

In still another optional manner, when the indication is used to indicate the offset time of the first scheduling time, a time at which the UE receives the indication is a first time, and the first time includes a system frame number SFN and/or a subframe number, when the first scheduling time includes a first system frame number SFN and/or a first subframe number, the second scheduling time includes the system frame number SFN and/or a third subframe number; or when the first scheduling time includes a first duration, the second scheduling time includes the first duration and the system frame number SFN, or the second scheduling time includes the first duration and a third subframe number, or the second scheduling time includes the first duration, the system frame number SFN, and a third subframe number, or when the first scheduling time includes a first period, the second scheduling time includes the first period and the system frame number SFN, or the second scheduling time includes the period and a third subframe number, or the second scheduling time includes the period, the system frame number SFN, and a third subframe number; or when the first scheduling time includes a first duration and a first period, the second scheduling time includes the first duration, the first period, and the system frame number SFN, or the second scheduling time includes the first duration, the first period, and a third subframe number, or the second scheduling time includes the first duration, the first period, the system frame number SFN, and a third subframe number;

where the third subframe number is obtained according to the subframe number and the offset time.

Further, the base station further includes: a receiver 703, configured to receive a suggested scheduling time sent by the UE; and the processor 701 is further configured to obtain the first scheduling time according to a scheduling mode of the wireless cellular system on the unlicensed spectrum and the suggested scheduling time.

The base station provided in this embodiment is configured to execute the technical implementation solution of the method for scheduling an unlicensed spectrum corresponding to FIG. 3. Details are not described herein again.

In conclusion, the base station provided in tins embodiment may send a first scheduling time and an indication to UE, so that it is ensured that the UE can use an unlicensed spectrum correctly, and a network communication capability is improved.

the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean execution sequences in various embodiments of the present invention. The execution sequences of the processes should be determined according to functions and internal logic of the processes, and should not be construed as any limitation on the implementation processes of the embodiments of the present invention.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interlaces. The indirect couplings or communication connections between the apparatuses or units may be implemented in electronic, mechanical, or other forms.

The units described as separate parts may or may not be physically separate, and pans displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A method for scheduling an unlicensed spectrum, comprising:
   receiving, by user equipment UE, a first scheduling time sent by a base station, wherein the first scheduling time is a time used by the UE to use the unlicensed spectrum based on a wireless cellular network and/or a time used by the UE to use the unlicensed spectrum based on a non-wireless cellular network;
   receiving, by the UE, an indication sent by the base station, wherein the indication is used to indicate that the base station has obtained the unlicensed spectrum, or indicate an offset time of the first scheduling time;
   obtaining, by the UE, a second scheduling time according to the indication and the first scheduling time;
   using, by the UE, the unlicensed spectrum according to the second scheduling time based on the wireless cellular network and/or the non-wireless cellular network; and
   sending, by the UE, a suggested scheduling time to the base station, so that the base station obtains the first scheduling time according to a scheduling mode of the wireless cellular system on the unlicensed spectrum and the suggested scheduling time.

2. The method according to claim 1, wherein when the indication is used to indicate that the base station has obtained the unlicensed spectrum,
   the method further comprises determining a first time at which the indication is received, wherein the first time comprises a system frame number SFN and/or a subframe number; and
   the obtaining, by the UE, a second scheduling time according to the indication and the first scheduling time comprises:
   when the first scheduling time comprises a first system frame number SFN and/or a first subframe number, the second scheduling time comprises the first time; or
   when the first scheduling time comprises a first duration, the second scheduling time comprises the first duration and the system frame number SFN, or the second scheduling time comprises the first duration and the subframe number, or the second scheduling time comprises the first duration, the system frame number SFN, and the subframe number; or
   when the first scheduling time comprises a first period, the second scheduling time comprises the first period and the system frame number SFN, or the second scheduling time comprises the first period and the subframe number, or the second scheduling time comprises the first period, the system frame number SFN, and the subframe number; or
   when the first scheduling time comprises a first duration and a first period, the second scheduling time comprises the first duration, the first period, and the system frame number SFN, or the second scheduling time comprises the first duration, the first period; and the subframe number, or the second scheduling time comprises the first duration, the first period, the system frame number SFN, and the subframe number.

3. The method according to claim 1, wherein when the indication is used to indicate the offset time of the first scheduling time, the obtaining, by the UE, a second scheduling time according to the indication and the first scheduling time comprises:
   when the first scheduling time comprises a first system frame number SFN, obtaining, by the UE, a second system frame number SFN according to the first system frame number SFN and the offset time; wherein the second scheduling time comprises the second system frame number SFN; or
   when the first scheduling time comprises a first subframe number, obtaining, by the UE, a second subframe number according to the first subframe number and the offset time, wherein the second scheduling time comprises the second subframe number; or
   when the first scheduling time comprises a first duration, obtaining, by the UE, a second duration according to the first duration and the offset time, wherein the second scheduling time comprises the second duration; or
   when the first scheduling time comprises a first period, obtaining, by the UE, a second period according to the first period and the offset time, wherein the second scheduling time comprises the second period.

4. The method according to claim 1, wherein when the indication is used to indicate the offset time of the first scheduling time,
   the method further comprises determining a first time at which the indication is received, wherein the first time comprises a system frame number SFN and/or a subframe number; and
   the obtaining, by the UE, a second scheduling time according to the indication and the first scheduling time comprises:
   when the first scheduling time comprises a first system frame number SFN and/or a first subframe number, the second scheduling time comprises the system frame number SFN and/or a third subframe number; or
   when the first scheduling time comprises a first duration, the second scheduling time comprises the first duration and the system frame number SFN, or the second scheduling time comprises the first duration and a third subframe number, or the second scheduling time comprises the first duration, the system frame number SFN, and a third subframe number; or
   when the first scheduling time comprises a first period, the second scheduling time comprises the first period and the system frame number SFN, or the second scheduling time comprises the first period and a third subframe number, or the second scheduling time comprises the first period, the system frame number SFN, and a third subframe number; or
   when the first scheduling time comprises a first duration and a first period, the second scheduling time comprises the first duration, the first period, and the system frame number SFN, or the second scheduling time comprises the first duration, the first period, and a third subframe number, or the second scheduling time comprises the first duration, the first period, the system frame number SFN, and a third subframe number;
   wherein the UE obtains the third subframe number according to the subframe number and the offset time.

5. A method for scheduling an unlicensed spectrum, comprising:
   sending, by a base station, a first scheduling time to user equipment UE, wherein the first scheduling time is a time used by the UE to use the unlicensed spectrum based on a wireless cellular network and/or a time used by the UE to use the unlicensed spectrum based on a non-wireless cellular network;

sending, by the base station, an indication to the UE, wherein the indication is used to indicate that the base station has obtained the unlicensed spectrum, or indicate an offset time of the first scheduling time, so that the UE obtains a second scheduling time according to the indication and the first scheduling time, and uses the unlicensed spectrum according to the second scheduling time based on the wireless cellular network and/or the non-wireless cellular network;

receiving, by the base station, a suggested scheduling time sent by the UE; and obtaining, by the base station, the first scheduling time according to a scheduling mode of the wireless cellular system on the unlicensed spectrum and the suggested scheduling time.

6. The method according to claim 5, wherein when the indication is used to indicate that the base station has obtained the unlicensed spectrum, a time at which the UE receives the indication is a first time, and the first time comprises a system frame number SFN and/or a subframe number, when the first scheduling time comprises a first system frame number SFN and/or a first subframe number, the second scheduling time comprises the first time; or when the first scheduling time comprises a first duration, the second scheduling time comprises the first duration and the system frame number SFN, or the second scheduling time comprises the first duration and the subframe number, or the second scheduling time comprises the first duration, the system frame number SFN, and the subframe number; or when the first scheduling time comprises a first period, the second scheduling time comprises the first period and the system frame number SFN, or the second scheduling time comprises the first period and the subframe number, or the second scheduling time comprises the first period, the system frame number SFN, and the subframe number; or when the first scheduling time comprises a first duration and a first period, the second scheduling time comprises the first duration, the first period, and the system frame number SFN, or the second scheduling time comprises the first duration, the first period, and the subframe number, or the second scheduling time comprises the first duration, the first period, the system frame number SFN, and the subframe number.

7. The method according to claim 5, wherein when the indication is used to indicate the offset time of the first scheduling time, when the first scheduling time comprises a first system frame number SFN, the second scheduling time comprises a second system frame number SFN, wherein the second system frame number SFN is obtained according to the first system frame number SFN and the offset time; or when the first scheduling time comprises a first subframe number, the second scheduling time comprises a second subframe number, wherein the second subframe number is obtained according to the first subframe number and the offset time; or when the first scheduling time comprises a first duration, the second scheduling time comprises the second duration, wherein the second duration is obtained according to the first duration and the offset time; or when the first scheduling time comprises a first period, the second scheduling time comprises a second period, wherein the second period is obtained according to the first period and the offset time.

8. The method according to claim 5, wherein when the indication is used to indicate the offset time of the first scheduling time, a time at which the UE receives the indication is a first time, and the first time comprises a system frame number SFN and/or a subframe number, when the first scheduling time comprises a first system frame number SFN and/or a first subframe number, the second scheduling time comprises the system frame number SFN and/or a third subframe number; or when the first scheduling time comprises a first duration, the second scheduling time comprises the first duration and the system frame number SFN, or the second scheduling time comprises the first duration and a third subframe number, or the second scheduling time comprises the first duration, the system frame number SFN, and a third subframe number; or when the first scheduling time comprises a first period, the second scheduling time comprises the first period and the system frame number SFN, or the second scheduling time comprises the first period and a third subframe number, or the second scheduling time comprises the period, the system frame number SFN, and a third subframe number; or when the first scheduling time comprises a first duration and a first period, the second scheduling time comprises the first duration, the first period, and the system frame number SFN, or the second scheduling time comprises the first duration, the first period, and a third subframe number, or the second scheduling time comprises the first duration, the first period, the system frame number SFN, and a third subframe number;

wherein the third subframe number is obtained according to the subframe number and the offset time.

9. User equipment, comprising:

a receiver, configured to:

receive a first scheduling time sent by a base station, wherein the first scheduling time is a time used by the user equipment UE to use an unlicensed spectrum based on a wireless cellular network and/or a time used by the UE to use an unlicensed spectrum based on a non-wireless cellular network; and receive an indication sent by the base station, wherein the indication is used to indicate that the base station has obtained the unlicensed spectrum, or indicate an offset time of the first scheduling time;

a processor, configured to:

obtain a second scheduling time according to the indication and the first scheduling time; and use the unlicensed spectrum according to the second scheduling time based on the wireless cellular network and/or the non-wireless cellular network; and a transmitter, configured to send a suggested scheduling time to the base station, so that the base station obtains the first scheduling time according to a scheduling mode of the wireless cellular system on the unlicensed spectrum and the suggested scheduling time.

10. The user equipment according to claim 9, wherein when the indication is used to indicate that the base station has obtained the unlicensed spectrum, the processor is configured to:

determine a first time at which the indication is received, wherein the first time comprises a system frame number SFN and/or a subframe number; and when the first scheduling time comprises a first system frame number SFN and/or a first subframe number, the second scheduling time is the first time; or when the first scheduling time comprises a first duration, the second scheduling time comprises the first duration and the system frame number SFN, or the second scheduling time comprises the first duration and the subframe number, or the second scheduling time comprises the first duration, the system frame number SFN, and the subframe number; or when the first scheduling time comprises a first period, the second scheduling time comprises the first period and the system frame number SFN, or the second scheduling time comprises the first period and the subframe number, or the second scheduling time comprises the first period, the system frame number SFN, and the subframe number; or when the first scheduling time comprises a first duration and a first period, the second scheduling time comprises the first duration, the first period, and the system frame number SFN, or the second scheduling time comprises the first duration, the first period, and the subframe number, or the second scheduling time comprises the first duration, the first period, the system frame number SFN, and the subframe number.

11. The user equipment according to claim 9, wherein when the indication is used to indicate the offset time of the first scheduling time, the processor is configured to:

when the first scheduling time comprises a first system frame number SFN, obtain a second system frame number SFN according to the first system frame number SFN and the offset time, wherein the second scheduling time comprises the second system frame number SFN; or when the first scheduling time comprises a first subframe number, obtain a second subframe number according to the first subframe number and the offset time, wherein the second scheduling time comprises the second subframe number; or when the first scheduling time comprises a first duration, obtain a second duration according to the first duration and the offset time, wherein the second scheduling time comprises the second duration; or when the first scheduling time comprises a first period, obtain a second period according to the first period and the offset time, wherein the second scheduling time comprises the second period.

12. The user equipment according to claim 9, wherein when the indication is used to indicate the offset time of the first scheduling time, the processor is configured to:

determine a first time at which the indication is received, wherein the first time comprises a system frame number SFN and/or a subframe number; and when the first scheduling time comprises a first system frame number SFN and/or a first subframe number, the second scheduling time comprises the system frame number SFN and/or a third subframe number; or when the first scheduling time comprises a first duration, the second scheduling time comprises the first duration and the system frame number SFN, or the second scheduling time comprises the first duration and a third subframe number, or the second scheduling time comprises the first duration, the system frame number SFN, and a third subframe number; or when the first scheduling time comprises a first period, the second scheduling time comprises the first period and the system frame number SFN, or the second scheduling time comprises the first period and a third subframe number, or the second scheduling time comprises the first period, the system frame number SFN, and a third subframe number; or when the first scheduling time comprises a first duration and a first period, the second scheduling time comprises the first duration, the first period, and the system frame number SFN, or the second scheduling time comprises the first duration, the first period, and a third subframe number, or the second scheduling time comprises the first duration, the first period, the system frame number SFN, and a third subframe number;

wherein the third subframe number is obtained according to the subframe number and the offset time.

13. A base station, comprising:

a processor, configured to obtain an unlicensed spectrum;

a transmitter, configured to:

send a first scheduling time to user equipment UE, wherein the first scheduling time is a time used by the UE to use the unlicensed spectrum based on a wireless cellular network and/or a time used by the UE to use the unlicensed spectrum based on a non-wireless cellular network; and send an indication to the UE, wherein the indication is used to indicate that the base station has obtained the unlicensed spectrum, or the indication is used to indicate an offset time of the first scheduling time, so that the UE obtains a second scheduling time according to the indication and the first scheduling time, and uses the unlicensed spectrum according to the second scheduling time based on the wireless cellular network and/or the non-wireless cellular network; and a receiver, configured to receive a suggested scheduling time sent by the UE; wherein the processor is further configured to obtain the first scheduling time according to a scheduling mode of the wireless cellular system on the unlicensed spectrum and the suggested scheduling time.

14. The base station according to claim 13, wherein when the indication is used to indicate that the base station has obtained the unlicensed spectrum, a time at which the UE receives the indication is a first time, and the first time comprises a system frame number SFN and/or a subframe number, when the first scheduling time comprises a first system frame number SFN and/or a first subframe number, the second scheduling time is the first time; or when the first scheduling time comprises a first duration, the second scheduling time comprises the first duration and the system frame number SFN, or the second scheduling time comprises the first duration and the subframe number, or the second scheduling time comprises the first duration, the system frame number SFN, and the subframe number; or when the first scheduling time comprises a first period, the second scheduling time comprises the first period and the system frame number SFN, or the second scheduling time comprises the first period and the subframe number, or the second scheduling time comprises the first period, the system frame number SFN, and the subframe number; or when the first scheduling time comprises a first duration and a first period, the second scheduling time comprises the first duration, the first period, and the system frame number SFN, or the second scheduling time comprises the first duration, the first period, and the subframe number, or the second scheduling time comprises the first duration, the first period, the system frame number SFN, and the subframe number.

15. The base station according to claim 13, wherein when the indication is used to indicate the offset time of the first scheduling time,
    when the first scheduling time comprises a first system frame number SFN, the second scheduling time comprises a second system frame number SFN, wherein the second system frame number SFN is obtained according to the first system frame number SFN and the offset time; or
    when the first scheduling time comprises a first subframe number, the second scheduling time comprises a second subframe number, wherein the second subframe number is obtained according to the first subframe number and the offset time; or
    when the first scheduling time comprises a first duration, the second scheduling time comprises the second duration, wherein the second duration is obtained according to the first duration and the offset time; or
    when the first scheduling time comprises a first period, the second scheduling time comprises a second period, wherein the second period is obtained according to the first period and the offset time.

16. The base station according to claim 13, wherein when the indication is used to indicate the offset time of the first scheduling time, a time at which the UE receives the indication is a first time, and the first time comprises a system frame number SFN and/or a subframe number,
    when the first scheduling time comprises a first system frame number SFN and/or a first subframe number, the second scheduling time comprises the system frame number SFN and/or a third subframe number; or
    when the first scheduling time comprises a first duration, the second scheduling time comprises the first duration and the system frame number SFN, or the second scheduling time comprises the first duration and a third subframe number, or the second scheduling time comprises the first duration, the system frame number SFN, and a third subframe number; or
    when the first scheduling time comprises a first period, the second scheduling time comprises the first period and the system frame number SFN, or the second scheduling time comprises the period and a third subframe number, or the second scheduling time comprises the period, the system frame number SFN, and a third subframe number; or
    when the first scheduling time comprises a first duration and a first period, the second scheduling time comprises the first duration, the first period, and the system frame number SFN, or the second scheduling time comprises the first duration, the first period, and a third subframe number, or the second scheduling time comprises the first duration, the first period, the system frame number SFN, and a third subframe number;
    wherein the third subframe number is obtained according to the subframe number and the offset time.

* * * * *